(12) United States Patent
Vrudhula et al.

(10) Patent No.: US 12,327,075 B2
(45) Date of Patent: Jun. 10, 2025

(54) SYSTEM AND METHOD FOR CLOCK DISTRIBUTION IN A DIGITAL CIRCUIT

(71) Applicants: Sarma Vrudhula, Chandler, AZ (US); Ankit Wagle, Tempe, AZ (US)

(72) Inventors: Sarma Vrudhula, Chandler, AZ (US); Ankit Wagle, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/652,787

(22) Filed: May 1, 2024

(65) Prior Publication Data

US 2024/0370617 A1  Nov. 7, 2024

Related U.S. Application Data

(60) Provisional application No. 63/499,973, filed on May 3, 2023.

(51) Int. Cl.
*G06F 30/394* (2020.01)
*G06F 30/3312* (2020.01)

(52) U.S. Cl.
CPC ........ *G06F 30/3312* (2020.01); *G06F 30/394* (2020.01)

(58) Field of Classification Search
CPC .. G03F 9/7076; G03F 9/7084; G06F 2119/12; G06F 30/30; G06F 30/331; G06F 30/392; G06F 2119/06; G06F 30/327; G06F 30/3312; G06F 30/394; G06F 30/398; G06F 30/33; G06F 30/333; G06F 30/337; G06F 30/34; G06F 30/367; G06F 30/39; G06F 30/396; G06F 1/08; G06F 2119/10; G06F 30/3315; G06F 30/3323; G06F 1/06; G06F 1/10; G06F 1/3203; G06F 1/3234; G06F 1/3275; G06F 1/3287; G06F 11/0763; G06F 11/10; G06F 11/1032; G06F 11/1438; G06F 11/1469; G06F 11/25; G06F 12/0238; G06F 13/00; G06F 2111/04; G06F 2117/04; G06F 2119/18; G06F 3/0679; G06F 3/0688; G06F 30/32; G06F 30/3308; G06F 30/343;

(Continued)

(56) References Cited

U.S. PATENT DOCUMENTS

| | | | |
|---|---|---|---|
| 10,318,669 B2* | 6/2019 | Freeman | G06Q 30/0201 |
| 2022/0180031 A1* | 6/2022 | Pawar | G06F 30/396 |
| 2022/0300688 A1* | 9/2022 | Moceyunas | G06F 30/323 |

OTHER PUBLICATIONS

"Cadence." 2023. [Online]. Available: http://www.cadence.com.

(Continued)

*Primary Examiner* — Binh C Tat
(74) *Attorney, Agent, or Firm* — Womble Bond Dickinson (US) LLP

(57) ABSTRACT

A system and method for clock distribution in a digital circuit. In some embodiments, the method, includes: modifying a synchronous digital logic circuit, the modifying including: replacing a first D flipflop in the circuit with a local-clocking source flipflop; and connecting a clock output of the local-clocking source flipflop to a clock input of a second D flipflop, wherein the replacing and connecting increases an objective function, the objective function being based on the number of high drive strength cells in a logic cone preceding the second D flipflop.

19 Claims, 27 Drawing Sheets

(58) Field of Classification Search
CPC ...... G06F 9/4401; G06F 9/4406; G06F 11/27;
G06F 12/0207; G06F 12/04; G06F
12/0607; G06F 13/16; G06F 13/28; G06F
15/7825; G06F 15/7867; G06F 17/11;
G06F 18/2185; G06F 2111/02; G06F
2119/00; G06F 30/27; G06F 30/323;
G06F 30/347; G06F 30/373; G06F
9/3804; G06F 9/3867; G06F 9/4494;
G06F 9/455; G06F 9/4881; G06F 9/54;
G06F 9/542; H01L 2924/15311
USPC ................................................. 716/108–115
See application file for complete search history.

(56) References Cited

OTHER PUBLICATIONS

Alioto, Massimo, et al., "Variations in nanometer CMOS flip-flops: Part II—Energy variability and impact of other sources of variations," IEEE Trans. Circuits Syst. I, Reg. Papers, vol. 62, No. 3, pp. 835-843, Aug. 2015.
Brasen, D., et al., "Post-placement buffer reoptimization," in IEEE EUASIC. Paris, France: IEEE Comput. Soc. Press, 1992, pp. 156-161.
Chaturvedi, Rishi, et al., "Buffered clock tree for high quality IC design," in IEEE ISCAS. San Jose, CA, USA: IEEE Comput. Soc, 2004, pp. 381-386.
Chen, Chunhong, et al. "On gate level power optimization using dual-supply voltages," IEEE Trans. VLSI Syst., vol. 9, No. 5, pp. 616-629, Oct. 2001.
Chen, Jianli, et al., "Clock-aware placement for large-scale heterogeneous FPGAs," IEEE Trans. Comput.-Aided Design Integr. Circuits Syst., vol. 39, No. 12, pp. 5042-5055, Dec. 2020. [Online]. Available: https://ieeexplore.ieee.org/document/8967157/.
Deokar, Rahul B., et al., "A fresh look at retiming via clock skew optimization," in IEEE Proc. DAC. San Francisco, California, United States: ACM Press, 1995, pp. 310-315.
Fishburn, John P., "Clock skew optimization," IEEE Trans. Comput., vol. 39, No. 7, pp. 945-951, Jul. 1990.
Han, Kwangsoo, et al., "A global-local optimization framework for simultaneous multi-mode multi-corner clock skew variation reduction," in IEEE Proc. DAC. San Francisco California: ACM, Jun. 2015, pp. 1-6.
Jiang, Iris Hui-Ru, et al., "INTEGRA: Fast multibit flip-flop clustering for clock power saving," IEEE Trans. Comput.-Aided Design Integr. Circuits Syst., vol. 31, No. 2, pp. 192-204, Feb. 2012.
Koh, Cheng-Kok, et al., "Chapter 13: Synthesis of clock and power/ground networks," in Electronic Design Automation: Synthesis, Verification, and Test. Amsterdam, The Netherlands: Morgan Kaufmann, 2009.
Kulkarni, Niranjan, et al., "A clock skewing strategy to reduce power and area of ASIC circuits," 2017 54th ACM/EDAC/IEEE Design Automation Conference (DAC), Austin, TX, USA, 2017, pp. 1-6. Available: https://ieeexplore.ieee.org/document/8060439.
Kuo, Yun-Chih, et al., "Clock-aware placement for large-scale heterogeneous FPGAs," in 2017 IEEE/ACM International Conference on Computer-Aided Design (ICCAD). Irvine, CA: IEEE, Nov. 2017, pp. 519-526. [Online]. Available: http://ieeexplore.ieee.org/document/8203821/.
Lin, Kuan-Yu, et al., "An efficient algorithm of adjustable delay buffer insertion for clock skew minimization in multiple dynamic supply voltage designs," in IEEE ASPDAC, Jan. 2011, pp. 825-830.
Lin, Longyang, et al., "Reconfigurable clock networks for wide voltage scaling," IEEE J. Solid-State Circuits, vol. 54, No. 9, pp. 2622-2631, Sep. 2019.
Mirsaeedi, Minoo, et al., "Simultaneous Gate Sizing and Skew Scheduling to Statistical Yield Improvement," in IEEE ISVLSI, Apr. 2008, pp. 467-470.
Mori, Makoto, et al., "A mulitple level network approach for clock skew minimization with process variations," in Proc. IEEE ASPDAC, Yohohama, Japan, 2004, pp. 263-268.
Nikolic, Borivoje, et al. "Sense amplifier-based flip-flop," in IEEE ISSC. San Francisco, CA, USA: IEEE, 1999, pp. 282-283.
Rajajaram, Anand, et al., "Robust Chip-Level Clock Tree Synthesis," IEEE J. Technol. Comput. Aided Design, vol. 30, No. 6, pp. 877-890, Jun. 2011.
Shen, Weixiang, et al., "Useful clock skew optimization under a multi-corner multi-mode design framework," in IEEE ISQED, Mar. 2010, pp. 62-68.
Song, Xiangnan, et al., "A variation aware register clustering methodology in near-threshold region," in Proc. IEEE 13th Int. Conf. ASIC (ASICON), Oct. 2019, pp. 1-4. [Online]. Available: https://ieeexplore.ieee.org/document/8983494/.
Sudarsanam, Yasawini, et al., "Clock skew automation for power and area reduction in deep sub micron designs," in 2010 IEEE Dallas Circuits and Systems Workshop, Oct. 2010, pp. 1-4.
Sun, Yiran, et al., "Buffer Sizing for Near-Threshold Clock Tree using Improved Genetic Algorithm," in 2019 IEEE 13th International Conference on ASIC (ASICON). Chongqing, China: IEEE, Oct. 2019, pp. 1-4. [Online]. Available: https://ieeexplore.ieee.org/document/8983483/.
Tan, Chuan Yean, et al., "Clustering of flip-flops for usefulskew clock tree synthesis," in 2018 23rd Asia and South Pacific Design Automation Conference (ASP-DAC). Jeju: IEEE, Jan. 2018, pp. 507-512. [Online]. Available: http://ieeexplore.ieee.org/document/8297374/.
Venkateswaran, Natesan, et al., "Clock-skew constrained placement for row based designs," in IEEE ICCD. Austin, TX, USA: IEEE Comput. Soc, 1998, pp. 219-220.
Vijayakumar, Arunkumar, et al., "Glitch Power Reduction via Clock Skew Scheduling," in IEEE ISVLSI. Tampa, FL, USA: IEEE, Jul. 2014, pp. 504-509.
Wang, Kai, et al., "Potential slack budgeting with clock skew optimization," in Proc. IEEE Iccd, San Jose, CA, USA, 2004, pp. 265-271.
Wang, Xuexiang, et al., "Timing-based and Balanced Register Clustering in Near- threshold Voltage Clock Tree Design," in 2020 IEEE 15th International Conference on Solid-State & Integrated Circuit Technology (ICSICT). Kunming, China: IEEE, Nov. 2020, pp. 1-3. [Online]. Available: https://ieeexplore.ieee.org/document/9278364/.
Website: OpenCores, 2021, "https://opencores.org/."
Werber, Jurgen, et al. "Timing optimization by restructuring long combinatorial paths," in IEEE ICCAD, Nov. 2007, pp. 536-543.
Xue, Tianxiong, et al., "Post routing performance optimization via multi-link insertion and non-uniform wiresizing," in IEEE ICCAD. San Jose, CA, USA: IEEE Comput. Soc. Press, 1995, pp. 575-580.
Yang, Jinghua, et al., "Fast and robust differential flipflops and their extension to multi-input threshold gates," in IEEE ISCAS. Lisbon, Portugal: IEEE, May 2015, pp. 822-825.
Yang, Liu, et al., "Interconnect Power Optimization Based on Timing Analysis," in IEEE ISVLSI, Mar. 2007, pp. 119-124.

* cited by examiner

| Design | Area ($\mu m^2$) | Wirelength ($\mu m$) | Power (mW) | Total Cap. (pF) |
|---|---|---|---|---|
| Baseline | 590 | 1222 | 0.14 | 0.61 |
| Skewed Baseline | 590 (0%) | 1749 (-43%) | 0.18 (-28%) | 0.71 (-16%) |
| Local Clock | 499 (15.4%) | 1038 (+15%) | 0.11 (+21%) | 0.54 (+11%) |

FIG. 3B

| PVT Corner | SS; 0.8 V; 125C | | TT; 1.0 V; 25C | | FF; 1.21 V; -40C | |
|---|---|---|---|---|---|---|
| | Mean | Stddev | Mean | Stddev | Mean | Stddev |
| Buffer | 122.1 | 7.6 | 66.6 | 2.6 | 55.7 | 2.2 |
| DFF Setup+C2Q | 468.2 | 37.9 | 219.9 | 10.7 | 203.3 | 9.7 |
| KVFF Setup+C2Q | 350.0 | 41.3 | 152.8 | 10.3 | 132.7 | 7.5 |
| KVFF C-CPO | 417.5 | 30.8 | 195.9 | 11.8 | 157.2 | 8.2 |

FIG. 6B

| PVT Corner | SS; 0.8 V; 125C | | TT; 0.9 V; 25C | | FF; 1.0 V; -40C | |
|---|---|---|---|---|---|---|
| | Mean | Stddev | Mean | Stddev | Mean | Stddev |
| Buffer | 7.0 | 0.3 | 5.9 | 0.2 | 5.4 | 0.2 |
| DFF Setup+C2Q | 83.9 | 3 | 67.3 | 2.2 | 57.9 | 2.4 |
| KVFF Setup+C2Q | 43.2 | 1.8 | 34.7 | 1.4 | 34.7 | 1.4 |
| KVFF C-CPO | 36.6 | 1.7 | 28.7 | 1.4 | 28.7 | 1.4 |

FIG. 6C

| | |
|---|---|
| $A_i$ | Arrival time of clock signal at flipflop $R_i$. |
| $S_i, H_i, C2Q$ | setup time, hold time and clock-to-Q delay of flipflop $R_i$. |
| $d_{i,j}, D_{i,j}$ | minimum and maximum combinational logic delays from $R_i$ to $R_j$, for $(R_i, R_j) \in A$. |
| $E_i$ | Clock-CPO delay for KVFF$_i$. |
| $V_i$ | flipflops in the vicinity of flipflop $R_i$. |

FIG. 6D

| Design | Design Type | Area (um2) | Wirelength (um) | Power (uW) | Area Change (%) | Wirelength Change (%) | Power Change (%) | Algo. Time (s) | Freq. (MHz) |
|---|---|---|---|---|---|---|---|---|---|
| Filter | DFF | 123412 | 296450 | 57.4 | - | - | - | - | 500 |
|  | KVFF | 103807 | 258505 | 45 | -15.9% | -12.8% | -21.6% | - | 500 |
|  | KVFF+LC | 73278 | 238188 | 34.8 | -40.6% | -19.7% | -39.4% | 1.46 | 500 |
| 64-bit Multiplier | DFF | 165809 | 560498 | 135.7 | - | - | - | - | 909 |
|  | KVFF | 110287 | 470935 | 115.6 | -33.5% | -16.0% | -14.8% | - | 909 |
|  | KVFF+LC | 105038 | 458267 | 110.8 | -36.7% | -18.2% | -18.3% | 2.69 | 909 |
| FPU | DFF | 96842 | 376085 | 45 | - | - | - | - | 299 |
|  | KVFF | 95914 | 361026 | 42.7 | -1.0% | -4.0% | -5.1% | - | 299 |
|  | KVFF+LC | 89335 | 333583 | 39 | -7.8% | -11.3% | -13.3% | 1.59 | 299 |
| Wallace multiplier | DFF | 58999 | 111483 | 34.9 | - | - | - | - | 719 |
|  | KVFF | 37941 | 93648 | 24.1 | -35.7% | -16.0% | -30.9% | - | 719 |
|  | KVFF+LC | 38688 | 93509 | 28.3 | -34.4% | -16.1% | -18.9% | 0.41 | 719 |
| AES | DFF | 557561 | 2802216 | 175.7 | - | - | - | - | 588 |
|  | KVFF | 519120 | 2717713 | 166.9 | -6.9% | -3.0% | -5.0% | - | 588 |
|  | KVFF+LC | 482747 | 2799167 | 155.2 | -13.4% | -0.1% | -11.7% | 1.42 | 588 |

FIG. 12B

| Design | Design Type | Area (um2) | Wirelength (um) | Power (uW) | Area Change (%) | Wirelength Change (%) | Power Change (%) | Algo. Time (s) | Freq. (MHz) |
|---|---|---|---|---|---|---|---|---|---|
| Filter | DFF | 38533 | 210032 | 53.64 | - | - | - | - | 1429 |
|  | KVFF | 37354 | 172481 | 37.82 | -3.1% | -17.9% | -29.5% | - | 1429 |
|  | KVFF+LC | 33527 | 171139 | 35.91 | -13.0% | -18.5% | -33.1% | 3.46 | 1429 |
| 64-bit Multiplier | DFF | 23577 | 186466 | 51.83 | - | - | - | - | 1923 |
|  | KVFF | 21851 | 186842 | 38.04 | -7.3% | 0.2% | -26.6% | - | 1923 |
|  | KVFF+LC | 21693 | 183163 | 36.64 | -8.0% | -1.8% | -29.3% | 75.12 | 1923 |
| FPU | DFF | 28707 | 181348 | 27.14 | - | - | - | - | 833 |
|  | KVFF | 23432 | 150667 | 17.61 | -18.4% | -16.9% | -35.1% | - | 833 |
|  | KVFF+LC | 23494 | 171598 | 15.93 | -18.2% | -5.4% | -41.3% | 5.73 | 833 |
| Wallace multiplier | DFF | 14243 | 66903 | 21.38 | - | - | - | - | 2000 |
|  | KVFF | 10843 | 57496 | 15.62 | -23.9% | -14.1% | -26.9% | - | 2000 |
|  | KVFF+LC | 8640 | 57160 | 14.91 | -39.3% | -14.6% | -30.3% | 1.11 | 2000 |
| AES | DFF | 245984 | 1934838 | 69.375 | - | - | - | - | 625 |
|  | KVFF | 247120 | 1789984 | 59.63 | 0.5% | -7.5% | -14.0% | - | 625 |
|  | KVFF+LC | 202369 | 1718158 | 58.15 | -17.7% | -11.2% | -16.2% | 134.37 | 625 |

FIG. 12C

| Drive Strength | Filter design in 65 nm | | | | Filter design in 28 nm | | | |
|---|---|---|---|---|---|---|---|---|
| | DFF | KVFF | KVFF+LC | | DFF | KVFF | KVFF+LC | |
| Mean | 15.4 | 12.1 | 11.6 | | 12.3 | 7.2 | 7.1 | |
| Std. Dev | 14.8 | 11.2 | 11.3 | | 10.4 | 1.5 | 1.3 | |

FIG. 14B

SYSTEM AND METHOD FOR CLOCK DISTRIBUTION IN A DIGITAL CIRCUIT

CROSS-REFERENCE TO RELATED APPLICATION(S)

The present application claims priority to and the benefit of U.S. Provisional Application No. 63/499,973, filed May 3, 2023, entitled "SYSTEM AND METHOD FOR CLOCK DISTRIBUTION IN A DIGITAL CIRCUIT", the entire content of which is incorporated herein by reference.

GOVERNMENT LICENSE RIGHTS

This invention was made with government support under 1701241 awarded by the National Science Foundation. The government has certain rights in the invention.

FIELD

One or more aspects of embodiments according to the present disclosure relate to digital circuits, and more particularly to a system and method for clock distribution in a digital circuit.

BACKGROUND

In the design of a synchronous digital circuit, various parameters may be adjusted to ensure that setup and hold time requirements for registers of the circuit are met.

It is with respect to this general technical environment that aspects of the present disclosure are related.

SUMMARY

According to an embodiment of the present disclosure, there is provided a method, including: modifying a synchronous digital logic circuit, the modifying including: replacing a first D flipflop in the circuit with a local-clocking source flipflop; and connecting a clock output of the local-clocking source flipflop to a clock input of a second D flipflop, wherein the replacing and connecting increases an objective function, the objective function being based on the number of high drive strength cells in a logic cone preceding the second D flipflop.

In some embodiments, the replacing and connecting further satisfies a plurality of constraints.

In some embodiments, a constraint of the plurality of constraints constrains the clock input of the second D flipflop to be connected to one clock output.

In some embodiments, a constraint of the plurality of constraints constrains a fan-out of the local-clocking source flipflop.

In some embodiments, a constraint of the plurality of constraints is based on: an arrival time of a clock edge at the local-clocking source flipflop; a delay of the local-clocking source flipflop; and an arrival time of a clock edge at the second D flipflop.

In some embodiments, a constraint of the plurality of constraints constrains the arrival of a data signal at the second D flipflop to precede the arrival of a clock edge at the second D flipflop by at least the setup time of the second D flipflop.

In some embodiments, a constraint of the plurality of constraints constrains a data signal to remain at an input of the local-clocking source flipflop, after the arrival of a clock edge at the local-clocking source flipflop, during at least the hold time of the local-clocking source flipflop.

In some embodiments, the method includes solving an integer linear programming problem to identify the first D flipflop and the second D flipflop.

In some embodiments, the solving of the integer linear programming problem includes solving the integer linear programming problem subject to constraints based on setup and hold times.

In some embodiments, a constraint based on a setup time allows a timing violation less than a margin.

In some embodiments, a constraint based on a hold time allows a timing violation less than a margin.

In some embodiments, the method further includes placing and routing the modified synchronous digital logic circuit.

In some embodiments, the placing and routing includes instructing a placing and routing tool that a data path from the second D flipflop to the local-clocking source flipflop is a false path.

According to an embodiment of the present disclosure, there is provided a method for fabricating a synchronous digital logic circuit, the method including: instructing a placing and routing tool that a data path from a first D flipflop of the synchronous digital logic circuit to a local-clocking source flipflop of the synchronous digital logic circuit is a false path, and placing and routing the synchronous digital logic circuit.

In some embodiments, the method further includes modifying a precursor circuit, the modifying including: replacing a second D flipflop in the precursor circuit with a local-clocking source flipflop; and connecting a clock output of the local-clocking source flipflop to a clock input of a first D flipflop, wherein the replacing and connecting satisfies a plurality of constraints and increases an objective function, the objective function being based on the number of high drive strength cells in a logic cone preceding the first D flipflop.

In some embodiments, a constraint of the plurality of constraints constrains the clock input of the second D flipflop to be connected to one clock output.

In some embodiments, a constraint of the plurality of constraints constrains a fan-out of the local-clocking source flipflop.

In some embodiments, a constraint of the plurality of constraints is based on: an arrival time of a clock edge at the local-clocking source flipflop; a delay of the local-clocking source flipflop; and an arrival time of a clock edge at the second D flipflop.

In some embodiments, a constraint of the plurality of constraints constrains the arrival of a data signal at the second D flipflop to precede the arrival of a clock edge at the second D flipflop by at least the setup time of the second D flipflop.

In some embodiments, a constraint of the plurality of constraints constrains a data signal to remain at an input of the local-clocking source flipflop, after the arrival of a clock signal at the local-clocking source flipflop, during at least the hold time of the local-clocking source flipflop.

BRIEF DESCRIPTION OF THE DRAWINGS

These and other features and advantages of the present disclosure will be appreciated and understood with reference to the specification, claims, and appended drawings wherein:

FIG. 3B is a table of improvements, according to an embodiment of the present disclosure;

FIG. 6B is a table of delay distributions, according to an embodiment of the present disclosure;

FIG. 6C is a table of delay distributions, according to an embodiment of the present disclosure;

FIG. 6D is a table showing notation, according to an embodiment of the present disclosure;

FIG. 12B is a table of performance parameters, according to an embodiment of the present disclosure;

FIG. 12C is a table of performance parameters, according to an embodiment of the present disclosure;

FIG. 14B is a table of drive strengths, according to an embodiment of the present disclosure;

DETAILED DESCRIPTION

The detailed description set forth below in connection with the appended drawings is intended as a description of exemplary embodiments of a system and method for clock distribution in a digital circuit provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
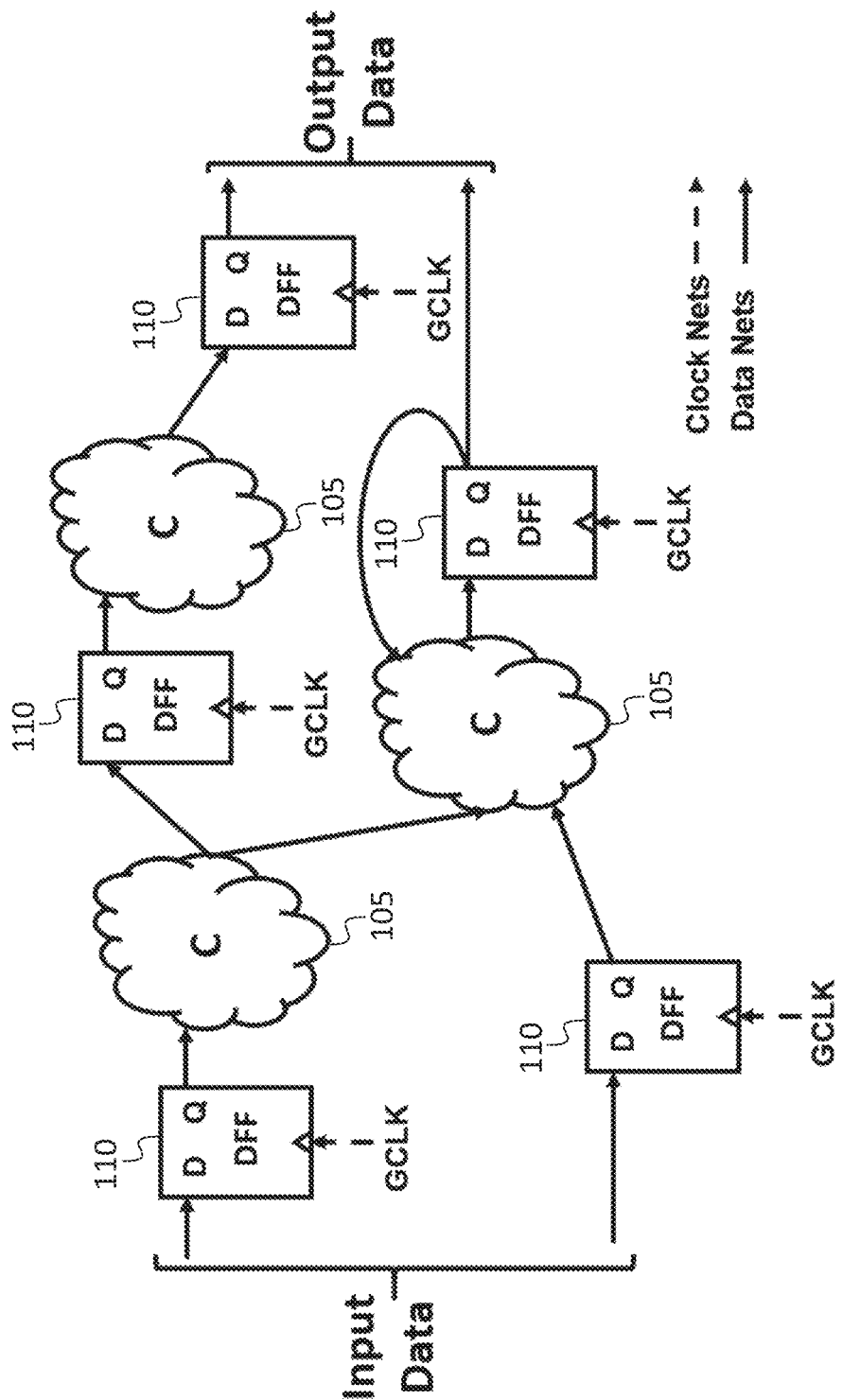
FIG. 1 is a schematic drawing of a digital circuit, according to an embodiment of the present disclosure.

Synchronous logic may be used in various digital systems. FIG. 1 depicts the structure of a general sequential circuit, which consists of a network of combinational logic cones (or simply "logic cones") 105 interconnected by registers 110 (which may be D flipflops (DFFs) as illustrated). The combinational logic cones are themselves directed acyclic networks of logic gates. The sequential network may be cyclic if there is at least one register on a cycle.

Some designs of such networks are based on the assumption that every register receives the clock signal (assuming single-phase clocking) at the same time. In practice, guaranteeing the simultaneity of clock arrival times may not be possible due, e.g., to the presence of the gate and interconnect delays, and may not be optimal if the delays in different combinational logic cones differ. The difference in the clock arrival times at two registers is referred to as clock skew between those registers. There are three possible ways to deal with clock skew: (i) design the clock distribution network (topology and layout) to achieve acceptably small skew, (ii) modify the drive strength of the combinational logic using gate sizing to meet the timing requirements, or (iii) manipulate skews deliberately to improve performance.

Certain techniques for controlling or mitigating clock skew have been incorporated into modern computer aided design (CAD) tools. Some specialized techniques propose the use of either multibit flipflops or cluster flipflops as a way of reducing the power of the clock tree. Intentional clock skewing (e.g., to compensate for unintentional clock skew, or to achieve better performance in circuits with combinational logic cones having different delays) may be employed in application specific integrated circuit (ASIC) and field programmable gate array (FPGA) architectures.

In general, deliberate clock skewing by adding buffers can be difficult due to the required precision of the delays, and the possibility of hold time violations, and it may be costly due to the additional power consumption of buffers and load on the clock tree. In practice, deliberate clock skewing may be limited to adding small amounts of skew to meet timing.

Figure 2:
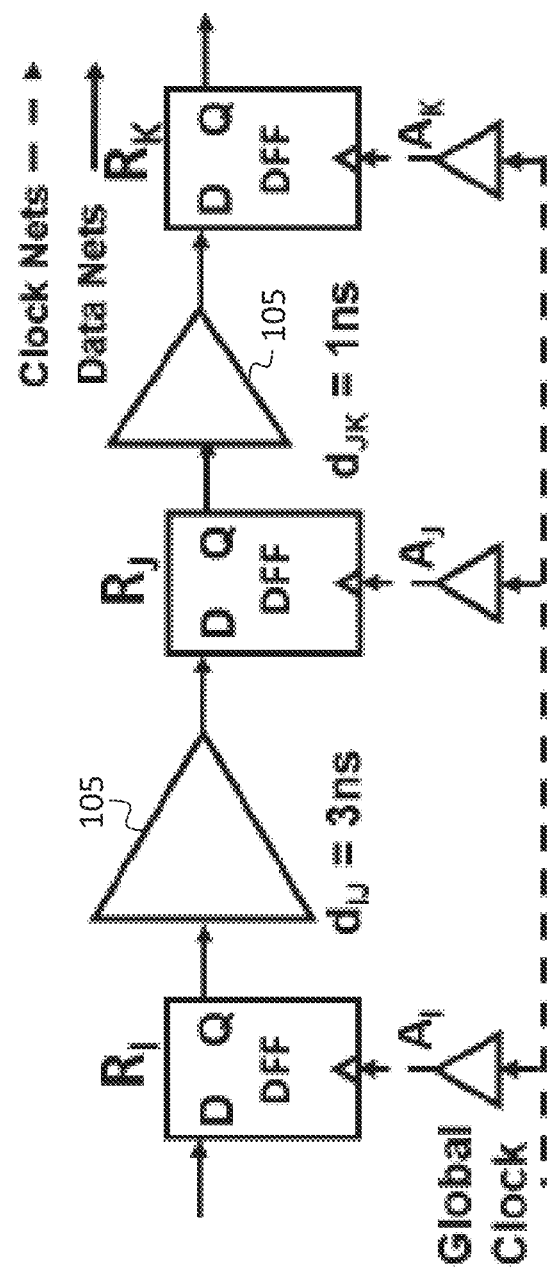
FIG. 2 is a schematic drawing of a digital circuit, according to an embodiment of the present disclosure.

Clock skewing may be implemented by introducing delay buffers in the clock distribution network. FIG. 2 shows how clock skewing can be used to improve performance.

The following notation may be used A; may denote the clock arrival time at flipflop $R_i$, $d_{i,j}$ may denote the delay from $R_i$ to $R_j$, the skew may be given by $skew_{i,j}=A_i-A_j$, and P may be the minimum clock period. For the circuit in FIG. 2, $$P = \max\{A_I - A_J + 3, A_J - A_K + 1\}.$$

With zero-skew clocking ($skew_{I,J}=skew_{J,K}=0$), P=3 ns. On the other hand, with $A_I=0$, $A_J=1$, and $A_K=0$, P=2 ns. As such, delaying the clock to $R_J$ by 1 ns reduces P from 3 ns to 2 ns. Alternatively, instead of reducing P, a negative skew results in relaxing the required time constraint at a flipflop input. The increased slack can allow for re-synthesizing the combinational logic, targeting a lower required time, resulting in slower logic, but with a smaller area and lower dynamic and static power. For instance, keeping P=3 ns, with $A_I=0$, $A_J=1$, $A_K=0$, allows for $d_{I,J}$ to be increased from 3 ns to 4 ns. Some embodiments are along the line of the latter example. As used herein, "slack" (or "setup time slack") refers to setup time margin.

Some embodiments provide a new strategy to use clock skewing to reduce area and power (both static and dynamic), without introducing additional clock buffers in the network and without sacrificing performance. The skewed clock may be generated by a sense-amp-based flipflop referred to as a Kulkarni Vrudhula flipflop (KVFF), which generates a completion signal in the form of a skewed clock pulse once it finishes latching its input. A KVFF and a DFF may each be an example of a register 110. This pulse is used to perform intentional clock skewing on timing critical paths without violating timing constraints. The resulting positive slack is utilized by gate sizing and mapping algorithms in the subsequent logic synthesis and placing and routing (P&R) phases of the design. In some embodiments, it is possible to create slack without requiring additional buffers. Not requiring buffers to skew the clock leads to additional power and area reduction.

As mentioned above, some embodiments use a circuit referred to as a KVFF. The KVFF may be functionally equivalent to a double-latch D flipflop (MSDFF), and it may also generate a skewed clock. The KVFF that is used to supply a clock may be referred to as a source, and the recipient of the clock may be referred to as a target. In some embodiments, the clocking scheme, in which some flipflops are clocked by others, is referred to as local clocking.

Some embodiments provide an efficient solution to the problem of identifying the best pairs of sources and targets. The optimality criterion used may be aimed at maximizing slack for the logic cones feeding the sources, without changing the clock period. Subsequent optimization may result in reducing the area and power of the logic cones. The method may apply to general ASIC circuits. Post-layout improvements in power, area, and wire-length without sacrificing performance have been demonstrated on publicly available benchmarks at two technology nodes—65 nm bulk complementary metal oxide semiconductor (CMOS) and 28 nm fully depleted silicon on insulator FDSOI. In some embodiments, local clocking is used to eliminate hold-time violations.

Figure 3A:
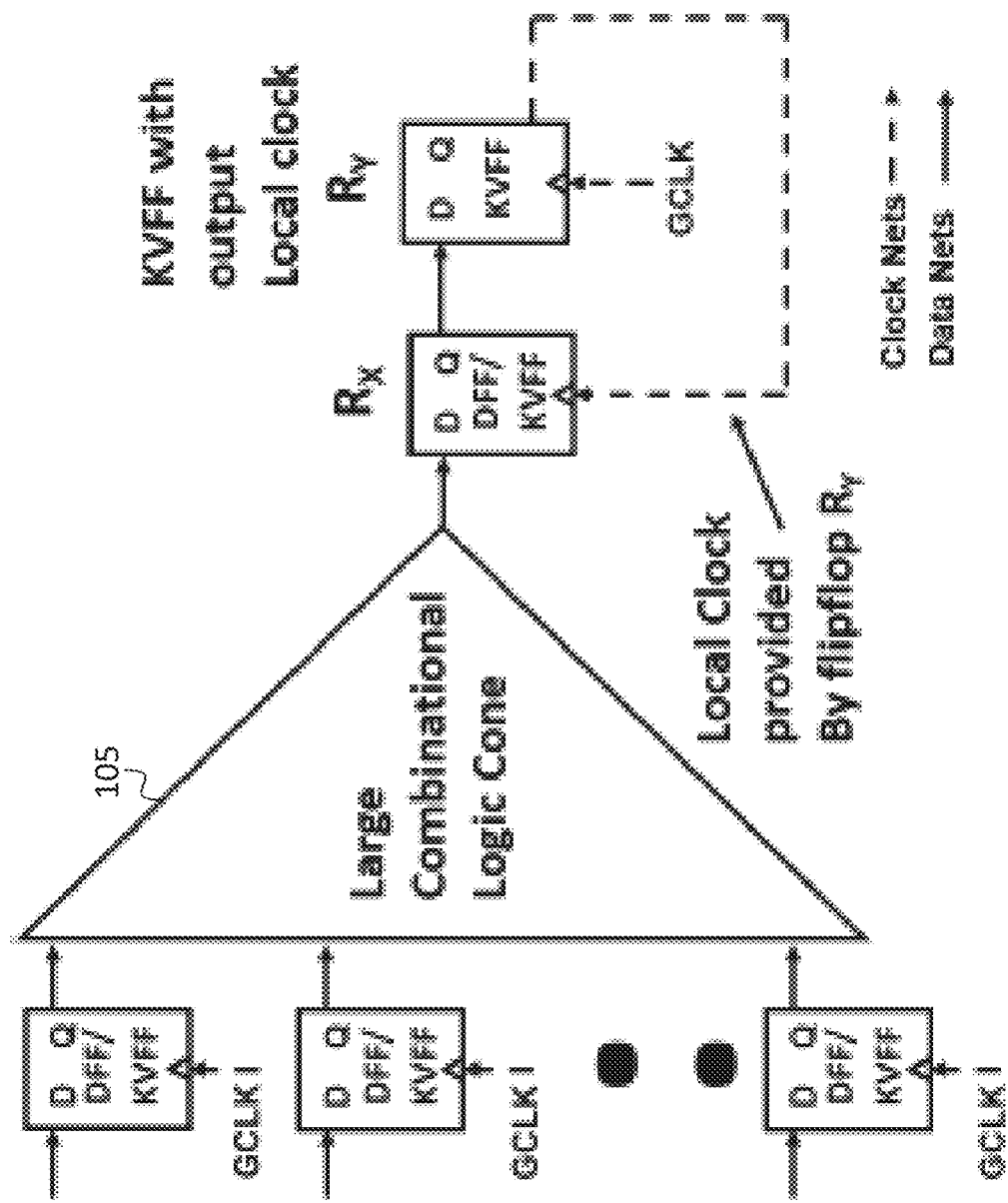
FIG. 3A is a schematic drawing of a digital circuit, according to an embodiment of the present disclosure.

The following example illustrates how local clocking using KVFFs may reduce power and area. For this example it is assumed that a KVFF (described below) is functionally equivalent to an MSDFF but has a clock output that is a delayed version of the input clock. FIG. 3A shows a test circuit that is a cascade of a large logic cone 105 and a redundant stage (e.g., the connection between flipflop X (labeled $R_x$) and flipflop Y (labeled $R_y$); this connection may be considered to be a trivial logic cone, containing no gates) to create a two-stage pipeline. Flipflop Y is a KVFF, the output clock of which triggers flipflop X, which is a DFF. Here, X is referred to as the target, and Y is its source. The test circuit was deliberately designed to exaggerate the imbalance in stage delays, in order to show the benefits of local clocking. The table of FIG. 3B summarizes the results of the experiment, showing improvements in various parameters against a conventional baseline circuit using a local clocking (LC) approach for a test circuit synthesized using the Genus™-Innovus™ tool-set. In the table of FIG. 3B, values in parentheses indicate the improvement achieved, if any (i.e., positive numbers indicate that a superior result was achieved, and negative numbers indicate an inferior result). Cadence Genus™ and Innovus™ were the two main tools used in the experiment. Power estimates were obtained using a value change dump (VCD) file on parasitic extracted netlists.

The baseline is a conventional design, i.e., without any deliberate clock skew. The "Skewed Baseline" refers to a design in which buffers were deliberately inserted at the clock input of flipflop X. The design labeled "Local Clock" refers to the design generated by one embodiment, in which the target flipflop X is clocked by the output clock of the source KVFF Y. For a fair comparison, the clock skew for both the Skewed Baseline and Local Clock are the same. The results demonstrate that the potential improvements are not just due to deliberate clock skewing, but also due to local clocking using KVFFs. The main advantage in this specific example is the reduction in area and power of the combinational logic due to the additional slack provided by the delayed local clocking. The problem of reducing gate sizes under timing slack is well studied and is heavily utilized in most commercial synthesis and automated layout tools. It is this capability that is exploited in this experiment.

When compared to conventional clocking, local clocking resulted in reductions of (i) 15.4% in the cell area, (ii) 15.1% in total wirelength, and (iii) 21.4% in dynamic power. A large part of the reduction is due to the reduction in the logic feeding the target flipflop due to the introduction of additional slack. The skewed baseline design did not result in any improvement in the cell area and increased the total wirelength by 43.1% and the dynamic power by 28.6%. This is because of the additional area and power needed by the buffers to skew the clock, which may counter any performance, power, or area gains that come from reducing the size of the logic cone. Note that the clock period of the circuit was not changed, and hence all the improvements are without sacrificing performance.

Figure 4:
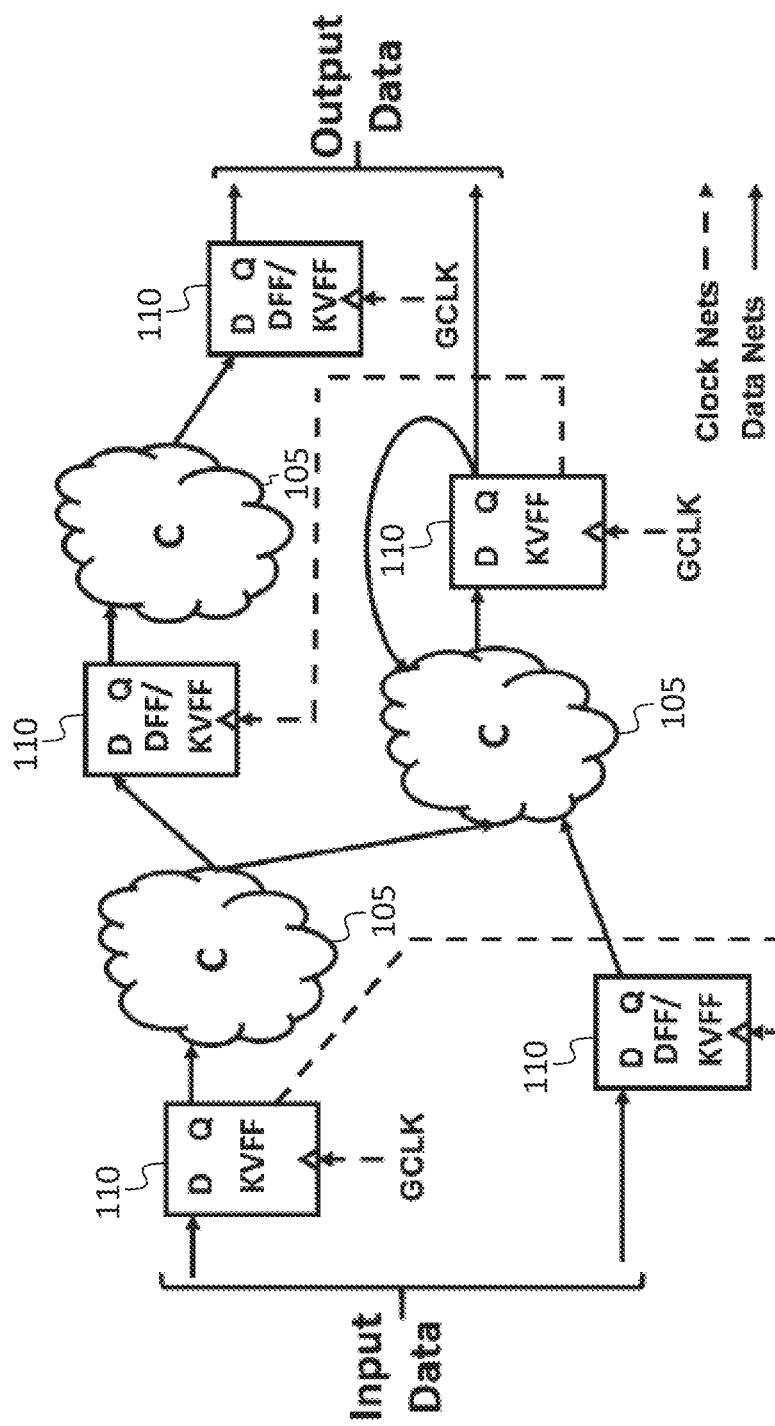
FIG. 4 is a schematic drawing of a digital circuit, according to an embodiment of the present disclosure.
Figure 5:
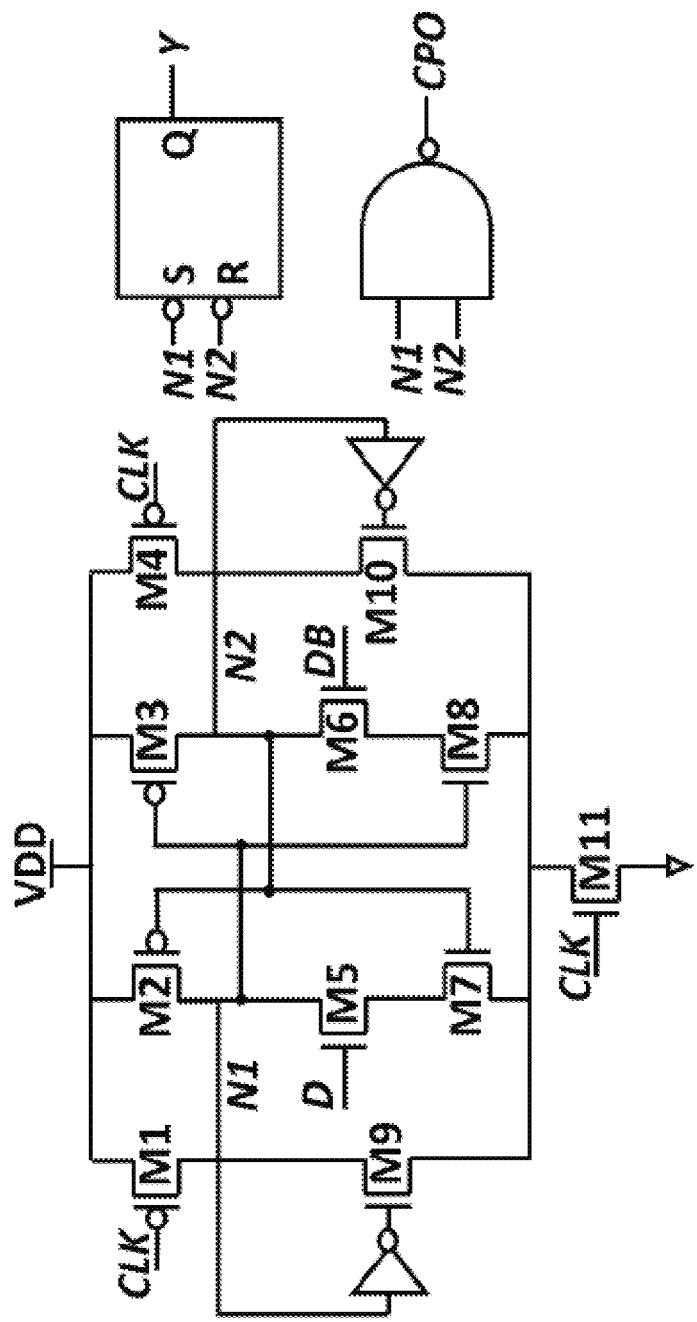
FIG. 5 is a schematic drawing of a flipflop, according to an embodiment of the present disclosure.

Flipflop Y generates an output clock trigger after it has finished latching its data. The local clock signal that triggers flipflop X, is therefore hazard free, i.e., it does not cause flipflop X to overwrite the previous data bit transmitted to flipflop Y until after the previously transmitted bit has been latched by flipflop Y. This is a significant advantage of a local clock generated using completion detection. Although the source (Y) and target (X) in the test circuit are on the same path, this need not be true in general. Any flipflop may serve as a source or a target. A source must be a KVFF, while a target may be a DFF or a KVFF. FIG. 4, which shows, in one example, the structure of a general synchronous circuit with local and global clocking, is a modified version of FIG. 1 showing some flipflops as sources and others as targets. FIG. 5 shows the architecture of the KVFF. It has an additional output clock signal (referred to as CPO). The KVFF is functionally equivalent to a MSDFF and is similar in operation to a strong-ARM flipflop (SAFF). However, the KVFF is faster than the MSDFF and more robust than the SAFF. The robustness advantage of the KVFF over the SAFF is primarily attributed to the additional feedback transistors M9 and M10 that are used in the KVFF. These transistors help to maintain the state of N1 and N2 even in the presence of noise. These feedback transistors are not present in SAFFs, and it may be shown that KVFFs can tolerate higher charge injection in nets N1 and N2 than SAFFs.

Although the KVFF has been chosen as the primary differential flipflop in some examples described herein, other architectures of differential flipflops may be used instead. As used herein, a "local-clocking source flipflop" is a flipflop that is suitable for use as a source flipflop in a circuit using local clocking. A local-clocking source flipflop may have the following three states:
  (i) A reset state: A state in which the flipflop does not generate/latch a valid value. Triggered when input clock is 0. This state is also used to set the local clock to 0.
  (ii) A valid state 0: A state in which the output of the flipflop is 0, which is used to set the local clock to 1. This state is triggered when input clock transitions from 0 to 1.
  (iii) A valid state 1: A state in which the output of the flipflop is 1, which is used to set the local clock to 1. This state is triggered when input clock transitions from 0 to 1. The existence of the three states helps identify whether the input data was latched in the flipflop correctly before generating the local clock output. A sense amplifier DFF may be suitable for generating a local clock because its operation is similar to that of a KVFF, i.e., it operates using three states. An MSDFF is not suitable for generating a local clock since it only has a valid state 0 and a Valid state 1.

The behavior of the KVFF is as follows. When CLK=0, N1=N2=1 due to M1 and M4, and all paths to ground are disconnected. With N1=N2=1, transistors M7 and M8 are both ON, and the active low NAND SR latch maintains its previous state. If D=1, then M5 is ON, and M6 is OFF. When CLK 0→1, M11 turns ON, discharging N1. N2 remains at 1. N1 being 0 keeps N2 at 1 because of M3. The NAND SR latch sets the output Q to 1. Therefore, on the rising edge of the clock, input D is stored until the end of the cycle. If D switches from 1 to 0 while CLK is high, M9 ensures that N1 is kept at 0 and N2 is 1.

When CLK=0, N1 and N2 are both 1, therefore CPO is also 0. Similarly, when CLK=1, N1 and N2 assume opposite values depending on the value of input D and CPO=1. Therefore the output CPO is a delayed version of the input CLK. Also, CPO changes only after the input state (D) is successfully read. Therefore output CPO is a "safe" clock signal to be used to clock another flipflop feeding the KVFF, as input D may be altered only after the flipflop latches it.

A race condition is not possible in a KVFF. This is because the architecture of a KVFF has two input signals: D and DB (DB=$\overline{D}$). For a race condition to occur, both D and DB should equal VDD, which would lead to both N1 and N2 being in a metastable state. However, since the input signals are complementary to each other, a race condition can never occur, i.e., when the clock signal CLK=1, only one of either the N1 or the N2 net will discharge to 0, while the other net stays at VDD.

The KVFF was designed in 65 nm bulk CMOS and 28 nm FDSOI technologies, and characterized using HSPICE on fully parasitic extracted netlists. The results are displayed in FIG. 6. The delay of the KVFF is 25% and 39% lower than that of the DFF, in the 65 nm and 28 nm technologies respectively. The speed advantage of KVFF flipflops can provide additional slack on the critical paths to further improve area and power. The KVFF is also more energy efficient. Its energy-delay product (EDP) is 20% and 40% lower than the DFF for 65 nm and 28 nm technologies. The areas of a DFF and a KVFF in 65 nm are 7.8 square microns and 9.4 square microns respectively, while in 28 nm, the areas are 2.6 square microns and 5.0 square microns respectively. Although the KVFF is larger than the DFF in both technologies (1.2× and 1.9×), this area increase is often compensated by the reduction in the area of the logic cones that are locally clocked.

Figure 6A:
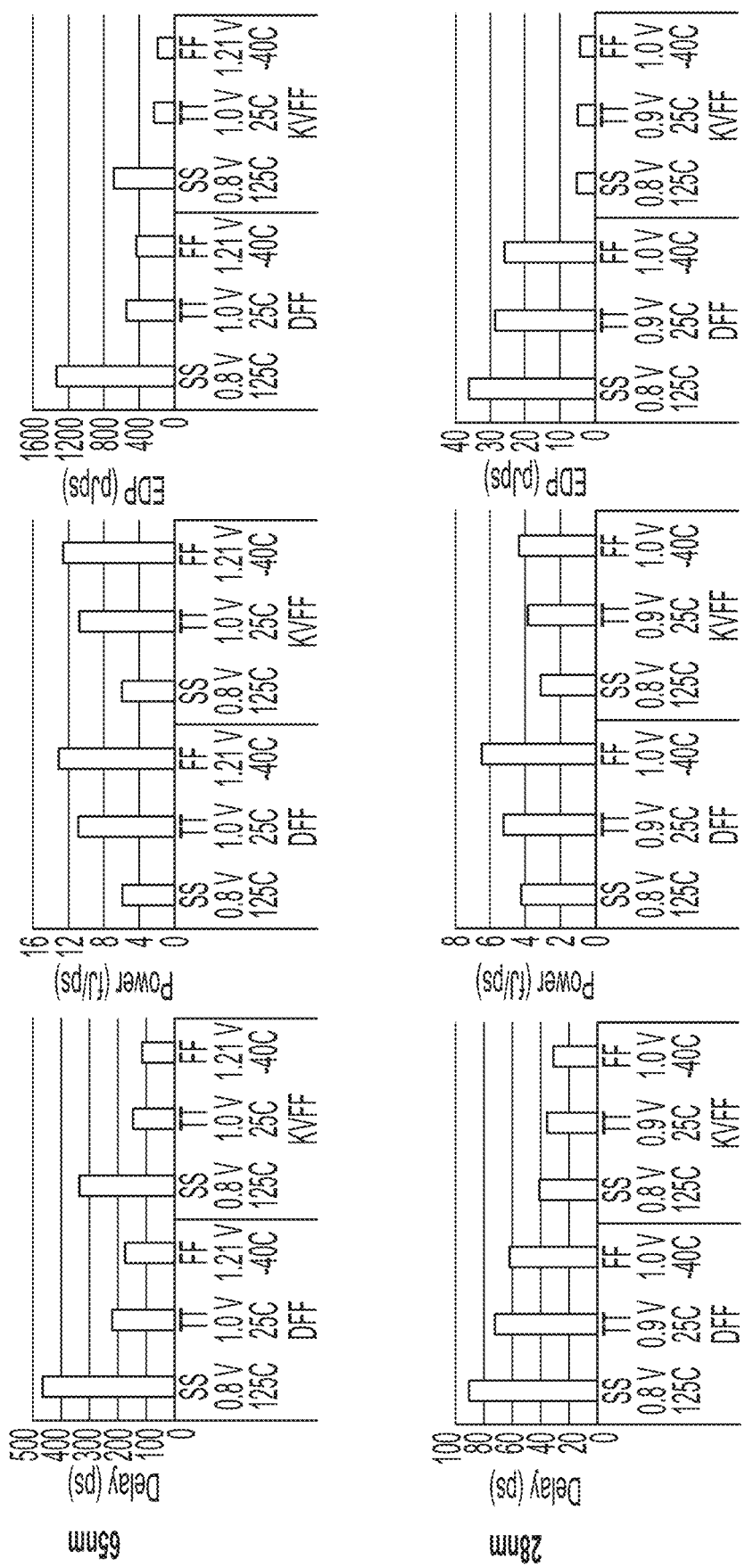
FIG. 6A is a set of graphs of performance comparisons, according to an embodiment of the present disclosure.

The tables of FIGS. 6B and 6C show mean values and standard deviations of delays that are the results of 100 K Monte Carlo simulations over manufacturing-process specific transistors' parameters, with global variations and local mismatch, for both versions of KVFF, and the DFF. In addition, the two flipflops in 65 nm and 28 nm respectively. The KVFF is as robust as the conventional DFF, with comparable values of mean and standard deviation. The last row in the tables of FIGS. 6B and 6C show delay values for a single buffer. In both 65 nm and 28 nm technologies, it is apparent (e.g., because the delay of a buffer is much smaller than the delay of a KVFF's C-CPO delay) that each KVFF used to generate a skewed clock saves several buffers and routing, depending on the buffer delay in the given technology. The use of buffers (instead of KVFFs) to generate the large clock skew also negatively impacts the balance of the clock tree. It may also be noted that the number of equivalent buffers is subject to change depending on the input slew and output load provided to the KVFF.

Given a sequential circuit consisting only of edge-triggered flipflops, the problem of optimal clock assignment is to identify the set of (source, target) pairs of flipflops such that skewing the clock of the target flipflop using the source flipflop reduces the area and power of the circuit. The process may involve starting from a circuit (or "precursor circuit") that lacks KVFFs, modifying this precursor circuit by substituting KVFFs for one or more of the D flipflops in the circuit, and connecting the clock outputs of the KVFFs to clock inputs of other flipflops in the circuit. Here, the source flipflop is a KVFF whose clock output is the clock input for the target flipflop. Motivated by the example in FIG. 3, the optimal clock assignment (OCA) problem may be formulated as an instance of an integer linear programming (ILP) problem. OCA is used to balance the delays between stages by increasing the slack at the input of the target flipflop and possibly reducing the slack at the input of the source flipflop.

The approach to OCA presented here is based on making small perturbations to an existing placed and routed design. The small perturbations in a localized space ensure that the slew rate of the internally generated clock does not degrade. That is, given a target, it may be advantageous to choose a source that is not too far away. The vicinity of a flipflop may be defined as a small neighborhood around the target from which sources can be chosen. The radius of this neighborhood may be determined through testing, which may indicate how far a source can clock a target without compromising the clock skew and without adding clock buffers. For example, for the 65 nm and 28 nm technology nodes mentioned in examples discussed herein, the radius may be 20 μm and 16 μm respectively. The sources in the vicinity of a target are identified using the layout information.

In modern design tools, slack may be largely minimized, leaving most flipflops with very little slack. As such, in some embodiments, candidate flipflops for which the clock needs to be skewed may be determined based on the number of high drive strength cells its input logic cone contains (instead of relying on slack information). Next, the constraints designed to check the setup and hold violations when skewing the clock may be modified to tolerate timing violations to a certain extent (by including margins in the constraints, as discussed below, in the context of constraints C4 and C5). These timing violations are then fixed during the resynthesis of the circuit, and the final circuit results presented herein (below) do not contain any timing violations.

The input to the algorithm is a general sequential synchronous circuit of the form shown in FIG. 1. It is represented as a directed graph G=(R, A), with |R|=n, and where R is the set of n vertices corresponding to flipflop in the circuit, and A is a set of directed arcs such that $(R_i, R_j) \in A$ if there is a combinational path starting from $R_i$ and ending at $R_j$. The table of FIG. 6D, which shows the notation used for the local clocking strategy describes the other related variables used in OCA. The decision variables $x_{i,j}$ are defined as follows, where j represents the potential source registers and i represents the potential target registers:

$$x_{i,j} = \begin{cases} 1 & R_j \text{ clocks } R_i \\ 0 & R_i \text{ is clocked using global clock.} \end{cases} \quad (1)$$

The objective function maximizes slack, weighted based on the drive strengths of the cells in the logic cones of the registers. This relaxes timing constraints on the registers associated with those cones that contain high drive strength cells. By relaxing timing constraints on such registers, power consumption is reduced. Local clocking skews the clock for these registers, thereby borrowing slack from the immediate timing paths that follow. For receiving a local clock, priority is given to the registers based on the number of high drive strength cells needed to fix the timing of their respective logic cones. The count of high drive strength cells in the logic cone of register i may be denoted $HDX_i$. Then, the objective function is as follows:

$$\max_{x_{i,j}} \left( \sum_{i=1}^{n} HDX_i \left( \sum_{j \in V_i} x_{i,j} \right) \right) \quad (2)$$

Instead of enumerating every possible $x_{i,j}$ decision variable, it is possible to direct the OCA with the help of two choices, (i) the choice of potential targets and (ii) the choice of potential sources.

The choice of potential targets may be made as follows. To distinguish and prioritize flipflops as potential targets for receiving a local clock, the ideal approach would be to provide slack to the flipflops one by one, and test the circuit for area and power reduction. However, this approach is extremely compute-intensive and practically impossible. One alternative is to prioritize flipflops with large input logic cones as potential targets. The assumption here is that when timing slack is provided to the flipflop, the logic cone may shrink in area and power by utilizing the relaxed timing constraints. However, a large logic cone does not necessarily indicate the presence of timing-critical paths. In some cases, the area of a logic cone is large only due to the presence of a high number of gates, none of which are on timing-critical paths. Providing additional slack on such paths will not lead to a significant reduction of area and power. Instead, by calculating the number of high drive strength cells in a logic cone, it may be possible to identify logic cones in which high drive strength cells have been used to meet the timing. This number also indicates how many high drive strength cells can be potentially affected when slack is provided to a register. If $Target_{HDX}$ is the minimum $HDX_i$ needed for register $R_i$ to be considered as a potential target, then the following condition may be used to identify the potential targets:

$$HDX_i \geq Target_{HDX} \quad (3)$$

Figure 7:
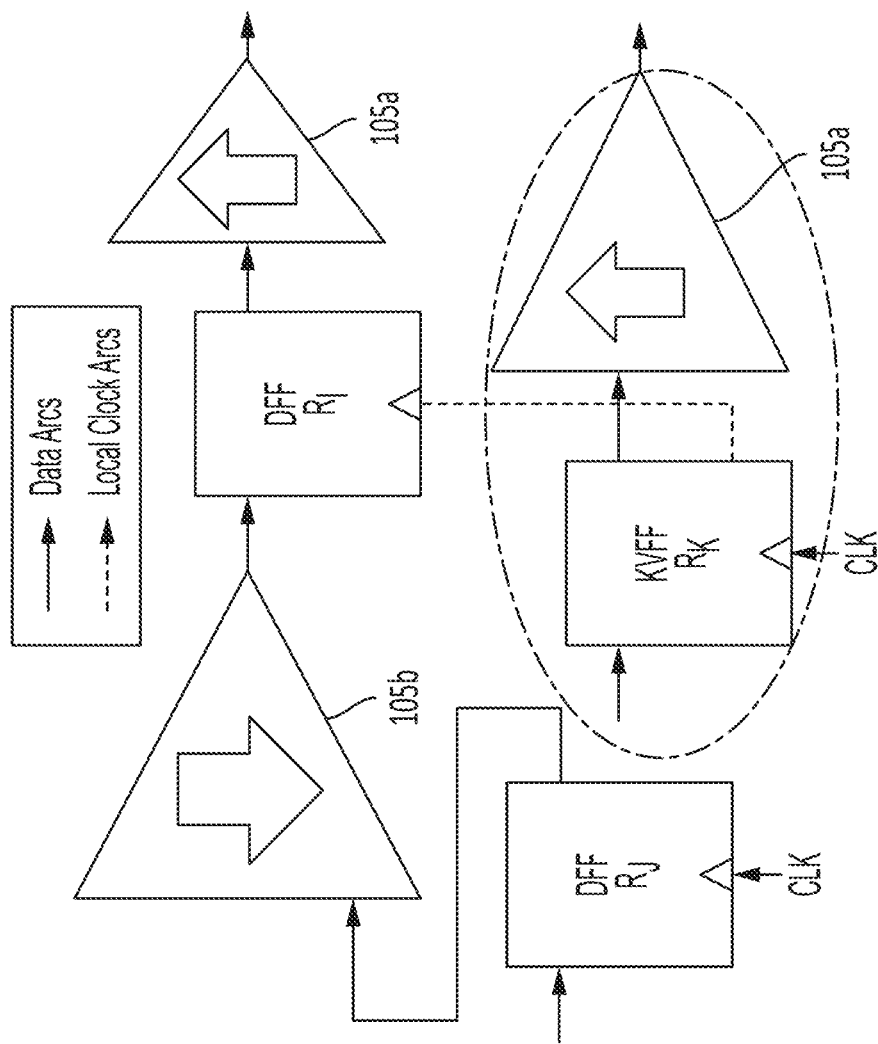
FIG. 7 is a schematic drawing of a digital circuit, according to an embodiment of the present disclosure.

Choosing the right source for supplying the local clock may be as important as picking the right target. The KVFF has a larger Clk-Q delay than a D flipflop (where the Clk-Q delay is not the same as the total delay). This means that replacing a DFF with a KVFF in a circuit increases the area of the logic cone that follows. If a source is chosen in an area-congested part of a circuit, then the congestion in that part may increase further due to the area increase of the logic cone. In other words, if the sources are chosen from congested areas, the drive strengths of the cells needed to implement the local clocking approach might lead to an overall increase in the area. This concept is demonstrated in FIG. 7, which shows how an increase (shown by an upward-pointing arrow) in the area of the logic cones 105a fed by a source in a congested area may exceed a decrease (shown by a downward-pointing arrow) in another logic cone 105b, and may negatively impact the overall area and power improvements gained from local clocking. Therefore, sources should preferably be chosen from less congested locations. Typically, the logic cones following sources in congested areas use a few high drive strength cells, instead of multiple low drive strength cells. This is a good indicator to identify registers placed in congested areas. Therefore, if $Source_{HDX}$ is the upper bound on the $HDX_i$ of a $R_i$ to be considered as a potential source, then the following condition may be used to filter the potential sources:

$$HDX_i \leq Source_{HDX} \quad (4)$$

Potential source-target pairs are determined based on how far the potential sources are from the potential targets. If a source is in the vicinity of a target, then the source and the target form a potential source-target pair. The objective function includes only those variables that represent the potential source-target pairs.

The values for both $Source_{HDX}$ and $Target_{HDX}$ may be specified by the designer, based on the technology node and the circuit being implemented. These values may be chosen such that the top 20% of the cells of the circuit (ordered based on their drive strengths) are above $Target_{HDX}$, while the bottom 20% are below $Source_{HDX}$. Furthermore, these values may be fine-tuned by the designer on a circuit-by-circuit basis.

Figure 8:
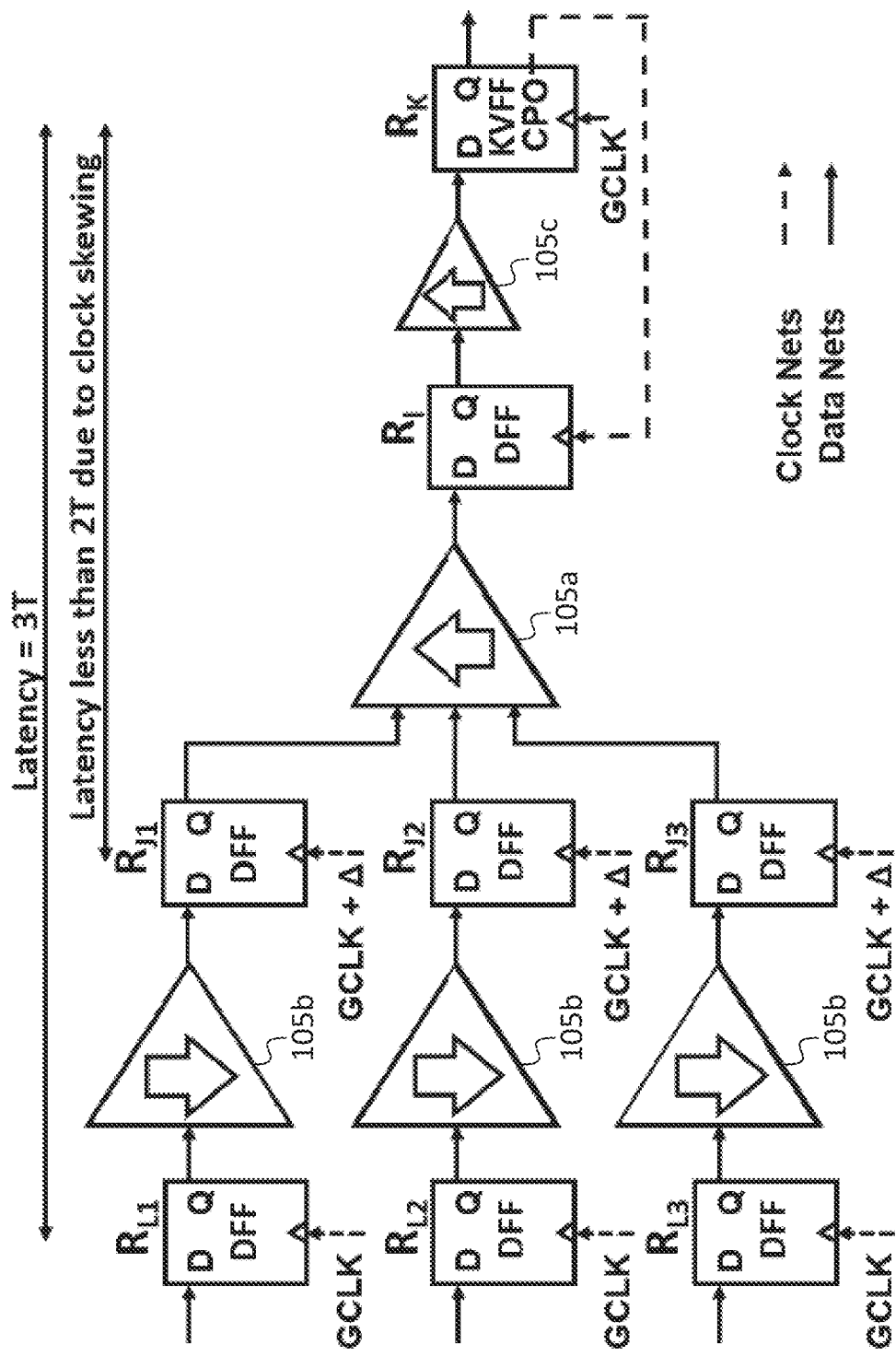
FIG. 8 is a schematic drawing of a digital circuit, according to an embodiment of the present disclosure.

The objective function is designed to provide additional slack to certain timing paths. When slack is provided to a specific timing path, although overall area and power reduction for the circuit will be observed, it does not necessarily guarantee a drop in the area and power specifically on that timing path. Based on the structure connected to the target logic cone, there may be several ways in which the area may be reduced. Registers for which the clock could not be skewed without the use of a local clock, due to the originally present timing constraints, may, when a local clock is used, be skewed using regular clock buffers. This leads to a ripple effect in the benefits that may be obtained from deliberately skewing the clock for a particular register. FIG. 8 shows the ripple effect of the benefits in area and power gained by clock skewing. The clock is skewed by a value of Δ for the register stage J (which includes registers J1, J2, and J3). As shown in FIG. 8, the clocking of register I by register K enables clock skews at registers J1, J2, and J3. Because of this, although there may be a small increase in the area and power of the logic cone 105a of I (and of the logic cone 105c of K), a significant drop in the area and power of the logic cones 105b of J1, J2, and J3 is observed. In FIG. 8, arrows pointing up (or down) represent increases or decreases, respectively, in area and power consumption.

The complete set of constraints needed for OCA may be referred to as C1, C2, C3, C4, and C5, defined as follows.

The constraints C1 may be referred to as clock uniqueness constraints. These constraints are based on the observation that a register can only receive a clock from one other register. If it does not receive a clock signal from any register, then the global clock is provided. This is ensured by using the constraint given in Equation 5.

$$\forall i \sum_{j \in V_i} x_{i,j} \leq 1 \quad (5)$$

If $R_i$ does not receive a clock from any flipflop $R_j$, i.e. $\Sigma_{j \in V_i} x_{i,j} = 0$, then it is clocked by the global clock.

The constraints C2 may be referred to as local clock (KVFF) fan-out constraints. A flipflop can provide a clock to at most a fixed number of flipflops; this constraint is represented by Equation 6. In experiments described below, the maximum fan-out of the local clock has been set to 1, to ensure the best clock slew rate from the source.

$$\forall j \sum_{i=1}^{n} x_{i,j} \leq 1 \quad (6)$$

The constraints C3 may be referred to as arrival constraints. When a flipflop $R_i$ is locally clocked by a flipflop $R_j$, the arrival time of the clock at $R_i$ depends on the time of arrival of the clock at flipflop $R_j$ and the delay of flipflop $R_j$ in producing an output clock. This constraint is represented by Equation 7:

$$\forall i A_i = \sum_{j \in V_i} x_{i,j}(A_j + E_j) \quad (7)$$

Equation 7 is a non-linear constraint (or a set of nonlinear constraints), which cannot be directly used in the ILP. These non-linear constraints can be replaced by a set of linear constraints as follows. Let $y_{i,j}=x_{i,j}(A_j+E_j)$ indicate the timing relationship between arrivals of the clocks. Let U denote an upper bound on the arrival times of the flipflops. U can be suitably chosen depending on the latency (arrival) constraints of the circuit. For example, to ensure that a register is not a source and a target at the same time, the value of U may be set to a value slightly less than 2*C−(CPO delay of the KVFF).

Therefore, $\forall \{i, j\}$, Equation 7 may be replaced with the following set of equations:

$$\forall i A_i = \sum_{j \in V_i} y_{i,j} \quad (8)$$

$$\forall i, j \in V_i y_{i,j} \leq U x_{i,j} \quad (9)$$

$$\forall i, j \in V_i y_{i,j} \geq 0 \quad (10)$$

$$\forall i, j \in V_i y_{i,j} \geq A_j + E_j - U(1 - x_{i,j}) \quad (11)$$

As a check, when $x_{i,j}=0$, $y_{i,j}=0$, and when $x_{i,j}=1$, $y_{i,j}=(A_j+E_j)$.

The ILP may ensure that the registers that clock each other do not form a cyclic chain. It avoids cyclic chains with the help of Equations 8 and 11. For example, for three registers $R_1$, $R_2$, and $R_3$, an assignment in which $R_1$ clocks $R_2$, $R_2$ clocks $R_3$ and $R_3$ clocks $R_1$ is an invalid assignment since none of the registers receive the global clock needed to generate the local clock. In this example, if $A_1=0$, then $A_2=A_1+E=E$ because $R_1$ clocks $R_2$. Similarly, $A_3=2E$ because $R_2$ clocks $R_3$. However, $A_1=3E$ because $R_3$ clocks $R_1$, which conflicts with the original value of $L_1=0$. Therefore, the assignment of $A_i$ on the local clocking chain must be monotonically increasing for the solution to be feasible in the ILP, which can only happen if the registers that clock each other do not form a cyclic chain.

The constraints C4 may be referred to as long path delay constraints. For any flipflop, the arrival of the data signal should precede the arrival of the clock edge by at least the setup time. For every register pair $R_i$ and $R_j$, connected through a combinational data-path, the time at which the data arrives (arrival time) at the input of $R_j$ is $A_i+C2Q_i+D_{i,j}$. The time at which the signal needs to arrive at the input of flipflop $R_j$ (required time) is $P+A_j-S_j$. Hence satisfying the setup time constraint requires $A_i+C2Q_i+D_{i,j} \leq P+A_j-S_j$.

Rearranging this inequality results in $$\forall i, j A_i \leq A_j + P - C2Q_i - D_{i,j} - S_j. \quad (12)$$

The difference between arrival time and the required time for a data-path is referred to as the slack. $P-C2Q_i-D_{i,j}-S_j+A_j-A_i$ denotes the slack available on the path from $R_i$ to $R_j$. The maximum value that can be assigned to $A_i$ is:

$$\forall i A_{imax} = \min(P - C2Q_i - D_{i,j} - S_j + A_j) \quad (13)$$

for all registers at the fanout of $R_i$.

Figure 9:
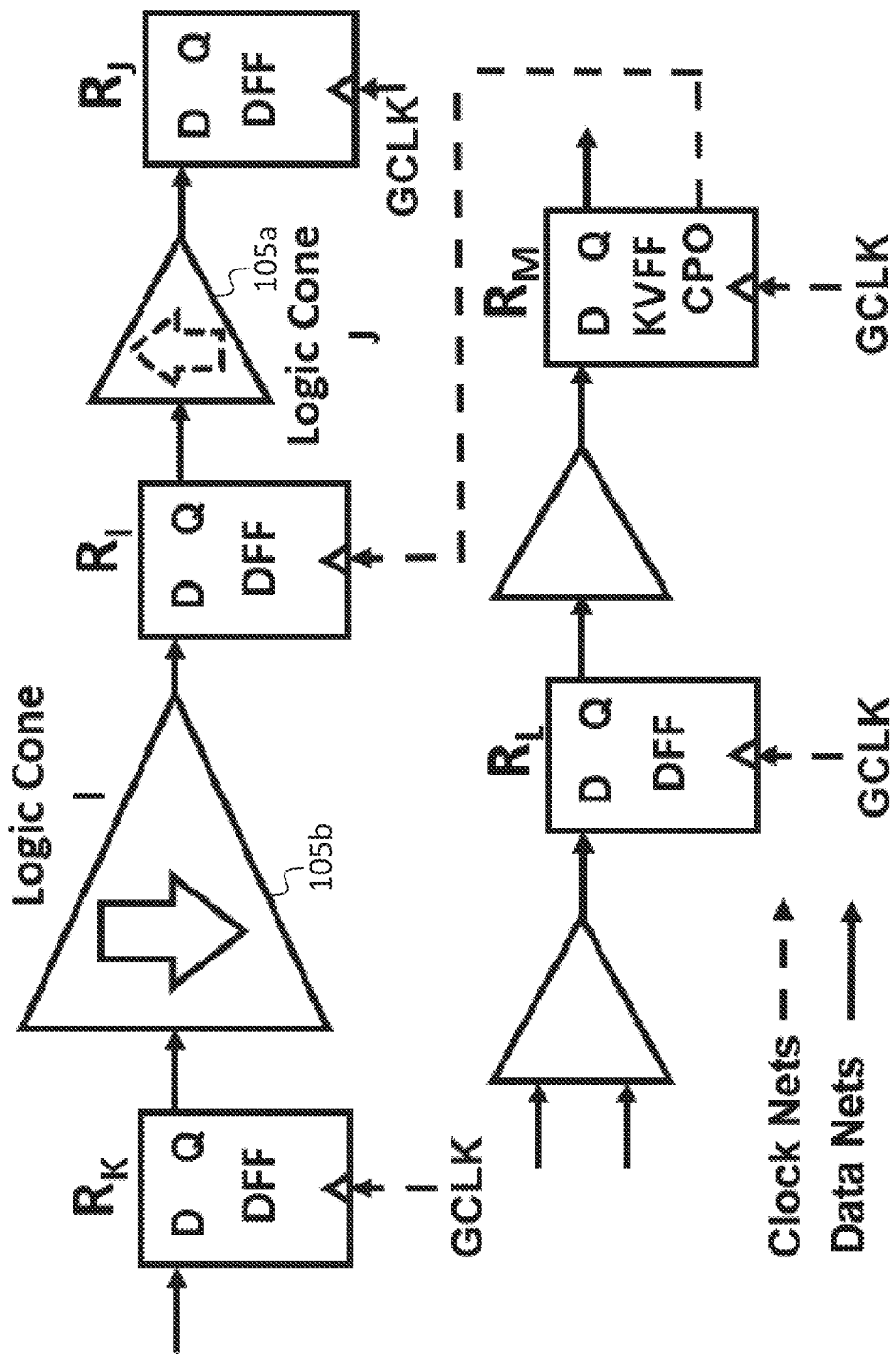
FIG. 9 is a schematic drawing of a digital circuit, according to an embodiment of the present disclosure.

FIG. 9 illustrates an LC approach for slack-optimized circuits. The register I is clocked locally using register K, thereby shrinking the large input logic cone 105b of register I at the cost of slight increase in the size of small input logic cone 105a of register J. FIG. 9 shows a circuit, referred to herein as G1, in which $R_I$ receives a clock at $A_I$. When $A_I=A_{Imax}$, it relaxes the timing constraint on logic cone I (which may be referred to as $C_I$), thereby allowing $C_I$ to shrink. Slack generated by increasing $A_I$ is utilized by replacing high speed standard cells in $C_I$, with smaller low-power cells. Note that in this case, since Equation 13 is still satisfied between $R_I$ and $R_J$, logic cone J (which may be referred to as $C_J$) can be left untouched.

Slack optimized designs are defined as designs which have already utilized all the available slack to optimize the area and power of the circuit. In the case of slack-optimized designs, the slack between $R_I$ and $R_J$ may not be available. Non-slack-optimized designs are defined as designs which have significant slack available throughout the circuit.

Figure 10:
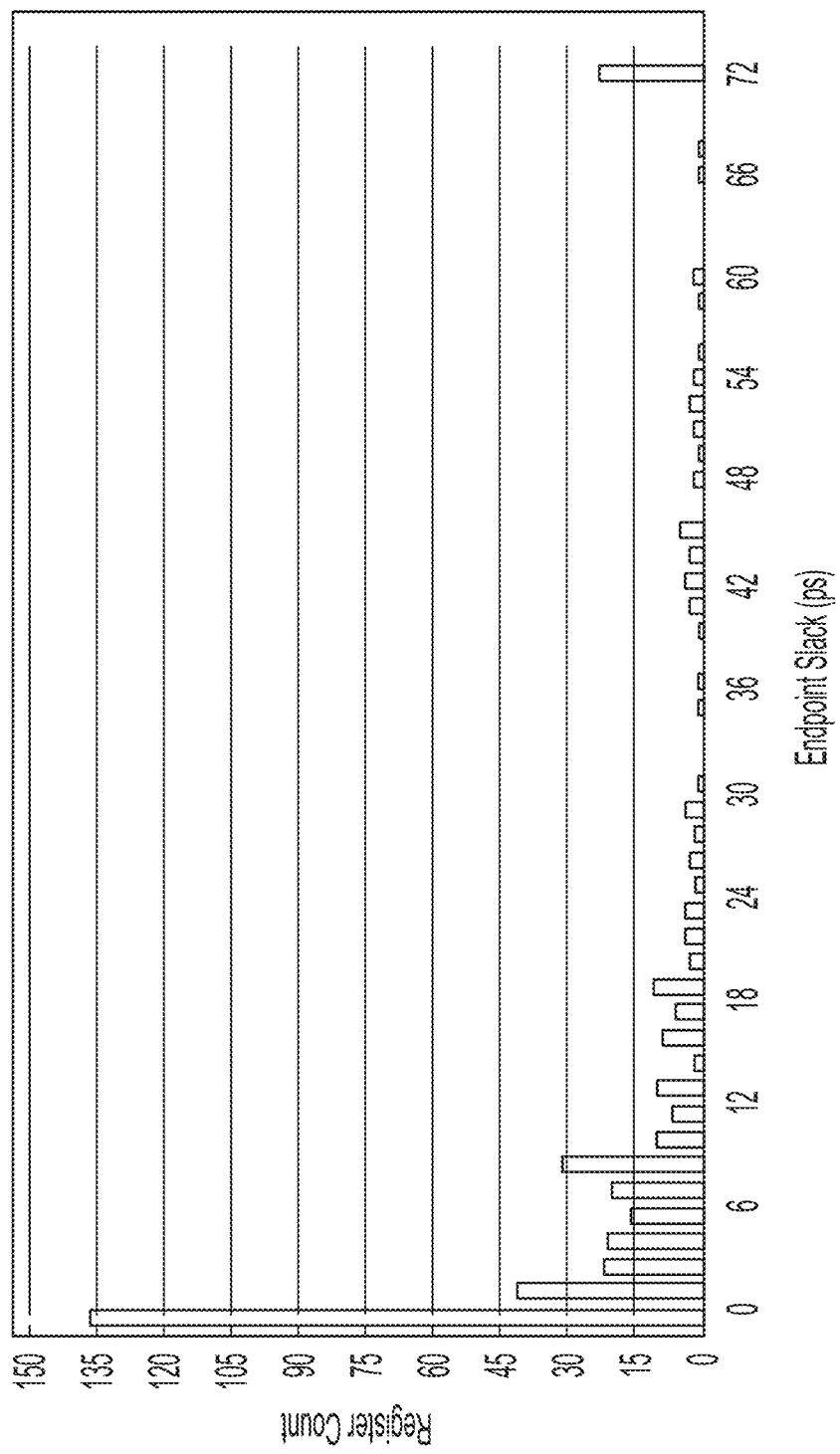
FIG. 10 is a graph of an endpoint slack histogram, according to an embodiment of the present disclosure.
Figure 11:
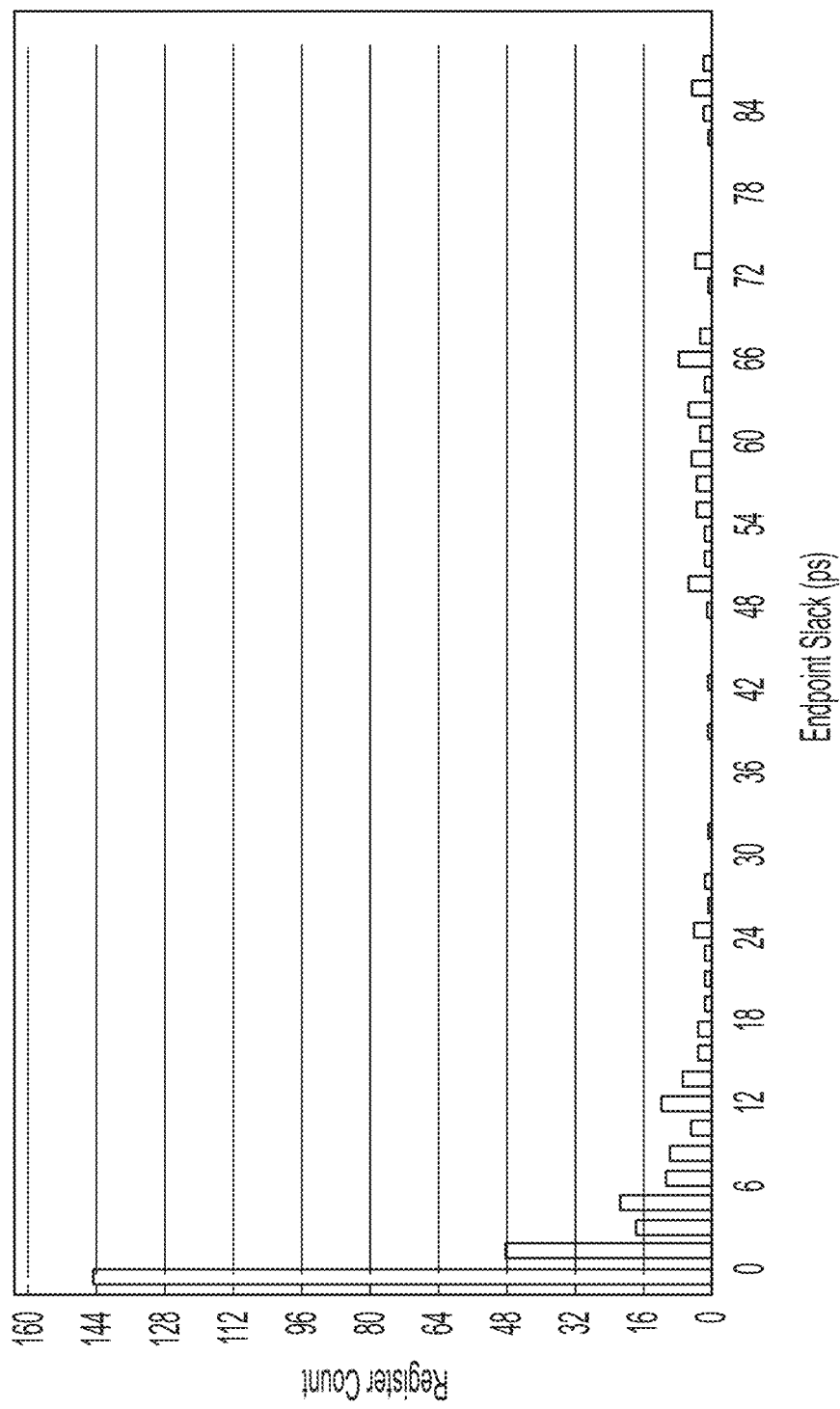
FIG. 11 is a graph of an endpoint slack histogram, according to an embodiment of the present disclosure.

In order to understand the difference between the slack-optimized and the non-slack-optimized designs, both versions of a 6-stage filter circuit (529 registers) were implemented. The histograms of the available slacks were extracted and are compared in FIG. 10 and FIG. 11. FIG. 10 shows an endpoint slack histogram for the 6-stage filter circuit, without slack optimization, using the ST-65 nm LP Library, extracted using Cadence Genus™. FIG. 11 shows an endpoint slack histogram for the 6-stage filter circuit, with slack optimization, using the ST-65 nm LP Library, extracted using Cadence Genus™.

For the filter circuit, the first histogram corresponds to the non-slack-optimized version, while the latter corresponds to a slack-optimized version. FIG. 11 has fewer registers with a slack of over 50 ps than FIG. 10. This means that FIG. 11 contains more timing-balanced paths than FIG. 10. In other words, a slack-optimized design has $A_i$ close to $A_{i\ max}$.

For G1 (FIG. 9), if $A_I$ is increased beyond $A_{I\ max}$, the size of $C_I$ will be further reduced. To meet the new timing constraints between $R_I$ and $R_J$, the area and power of $C_J$ would need to be increased, to make it faster. The overall impact on the area and power is determined by the combination of the small increase in the size of $C_J$, and the large drop in the size of $C_I$. The ILP formulation for local clocking is used to detect the opportunities where the overall area and power can be reduced. In the ILP formulation, a margin Mg (0≤Mg≤P) is added to allow $A_i$ to increase beyond $A_{i\ max}$. Therefore, the setup time equation is modified as follows:

$$\forall i, jA_i \le A_j + P - C2Q_i - D_{i,j} - S_j + Mg \quad (14)$$

The value of Mg may be found by regressing over its range. For the experiments, Mg of around 0.1 P generally gave the best results. The above long path constraint can be easily modified for multicycle data-paths, as well as uncertainty.

The constraints C5 may be referred to as short path delay constraints. After the rising edge of the clock, the input to a register must be stable for at least the specified hold time. For the path between $R_i$ and $R_j$, the earliest the data will arrive at $R_j$ is $A_i + C2Q_i + d_{i,j}$. This must be $H_j$ units after the clock arrives at $R_j$, i.e., $A_i + C2Q_i + d_{i,j} > A_j + H_j$. Rearranging this inequality results in $$\forall i, jA_i - A_j \le H_j - C2Q_i - d_{i,j} \quad (15)$$

As mentioned above, in some embodiments, the constraints (C4 and C5) that are based on setup and hold times may be violated to some extent. For example, timing violations of setup times by an amount up to a first margin (Mg) may be allowed, and timing violations of hold times by an amount up to a second margin may be allowed. This may be arranged, for example, by using, in corresponding ILP constraints (C4 and C5) setup and hold times that are shorter than those required for reliable operation of the hardware.

Experiments were conducted on several complex circuit blocks from Open-Cores, that are substantially larger than the ISCAS benchmark circuits. The netlists were synthesized using Cadence Genus™ and were placed and routed using Cadence Innovus™. Power was extracted from the parasitics annotated netlist. Multi-corner analysis was done to close the timing of the layout. The software package known as Gurobi was used for ILP.

In the global clocking methodology, the baseline circuit is the conventional design with only DFFs, all receiving the same global clock. Each baseline circuit was synthesized using a commercial 65 nm LP and 28 nm FDSOI standard cell library, for the maximum frequency that met timing using the Cadence Innovus™. For the 65 nm process, the PVT (process, voltage, temperature) corner used was SS (slow), 1.1 V, 105° C., while for the 28 nm process, the PVT corner used was SS (slow), 0.9 V, 125° C. The synthesized netlists were placed and routed (P&R) using Cadence Innovus™. To achieve timing closure, the tool was provided with two additional PVT corners: (FF (fast), 1.3 V, −40° C.) and (TT (typical), 1.2 V, 25° C.) for 65 nm and (FF, 1.1 V, −40° C.) and (TT, 1.0 V, 25° C.) for 28 nm. The post-P&R netlists were extracted and simulated with delay annotations, accounting for parasitics. The simulations yielded VCD (value change dump) data that records the number of toggles on all nets. This file was used, along with cell libraries and parasitics data, to obtain the dynamic and leakage power reports.

Figure 12A:
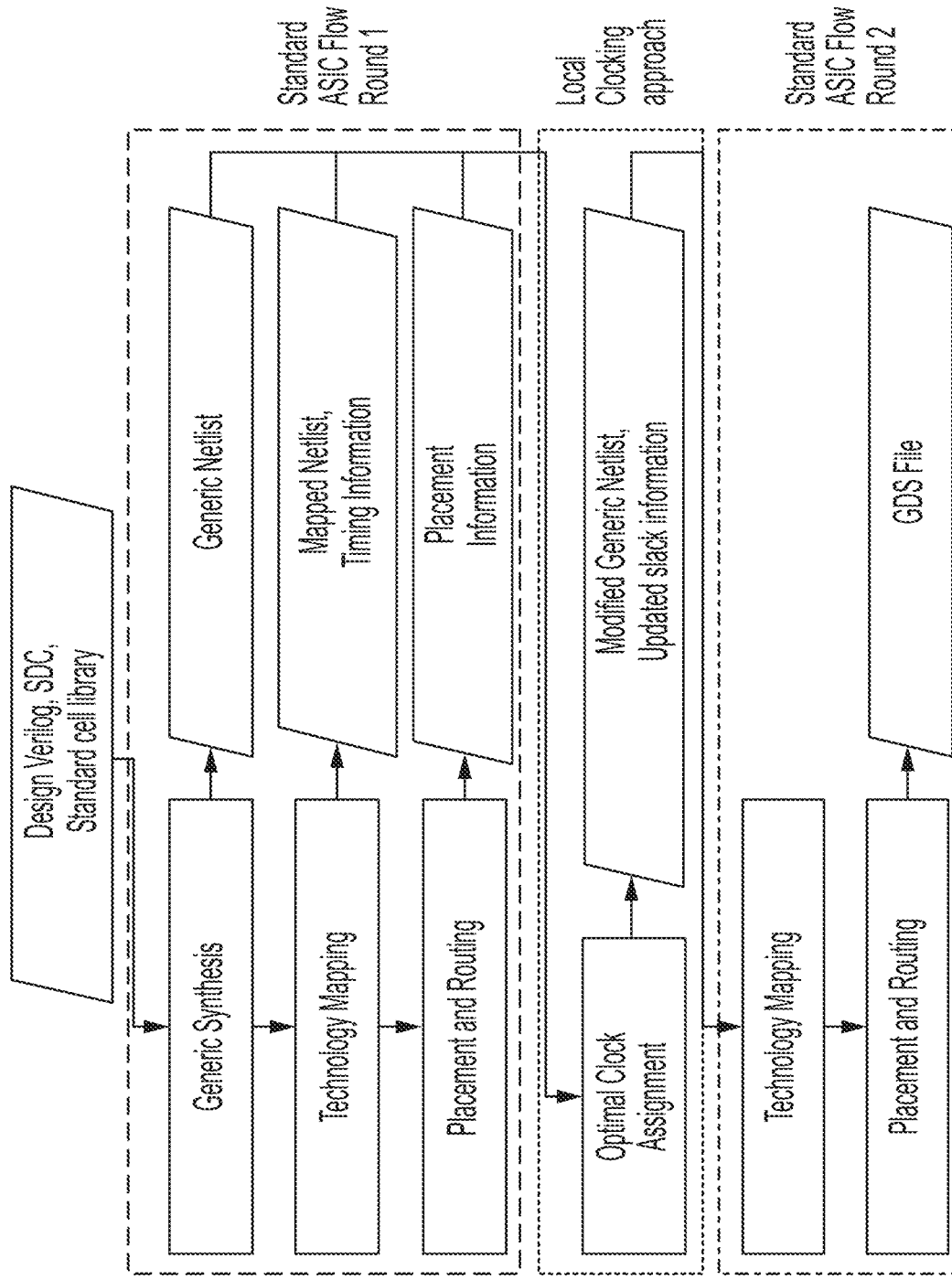
FIG. 12A is a diagram of a design flow, according to an embodiment of the present disclosure.

In the local clocking methodology, the ILP formulation described above is used to determine which flipflops will be the sources, and which ones will be the targets. This formulation is integrated into the conventional ASIC design flow using the local clocking design flow shown in FIG. 12A.

A given design is first synthesized to produce a generic netlist (composed of technology-independent gates) and a standard cell netlist (composed of technology-specific gates). The standard cell netlist is processed through the standard placement and routing (PnR or P&R) flow. The placement locations of all the registers are extracted from the results of the PnR. Registers in close proximity to each other are identified based on this placement information.

OCA identifies the best set of source-target pairs by processing the netlist, its placement locations, and its timing information. It also implements them on the generic netlist. This new generic netlist, with updated timing constraints, is then passed through the synthesis flow. The use of a generic netlist for adding the source-target pairs allows for remapping of the standard cells based on the new slack constraints induced by the source-target pairs. The new synthesized standard cell is then taken through the conventional PnR flow to generate the Graphic Design System (GDS) file.

The delay of a KVFF's C-CPO is affected by both the input clock's slew rate and the load on its CPO pin, which is determined by the distance between the KVFF and its target. To avoid variations in the C-CPO delay, the load on the CPO pin is restricted by only allowing potential source-target pairs that are in the vicinity of each other. Additionally, the input clock's slew rate is controlled by assigning an appropriate clock slew rate for the KVFF in Innovus™.

The locally clocked flipflops are not a part of clock tree synthesis (CTS), as they receive clock signals from KVFFs. As a result, the clock tree generated by the placement and routing tool (Cadence™ Innovus™) includes only flipflops that receive the global clock. Therefore, the balance of the clock tree will not be affected after applying the local clocking strategy.

Because adequate hold time is ensured for each KVFF that clocks all DFFs from which it receives data, the place and route tool may be instructed not to check for hold time violations for such KVFFs. This may be arranged, for example, by instructing the place and route tool that each data path from (i) a D flipflop clocked by a KVFF to (ii) the KVFF is a false path.

The following five benchmark circuits were chosen for the evaluation of local clocking: a filter, a 64-bit multiplier, a floating-point unit (FPU), a Wallace multiplier, and an Advanced Encryption Standard (AES) circuit. The filter circuit was chosen since it is a data-path-dominated circuit that has multiple pipelining layers, with certain stages providing feedback to earlier stages. Skewing the clock of flipflops with feedback paths affects the timing of all connected flipflops. Unlike the filter circuit, the 64-bit multiplier circuit only has feed-forward data paths, and hence skewing the clock of a flip-flop only impacts the timing of the flipflops in the subsequent stages. The FPU circuit also contains multiple pipeline stages with feedback, but it has an equal number of control and data paths and uses control blocks to move floating-point data within the design for its arithmetic blocks to process. The Wallace multiplier circuit is a data-path-dominated circuit that has only three pipeline stages. As a result, only the second stage can be skewed, since the input and output flipflops cannot be skewed in a design. The AES circuit is a larger circuit with over a thousand flipflops with deep pipeline stages, and is a finite-state machine (FSM) dominated circuit.

Improvements were made, using local clocking, in area, wirelength and power consumption of Open-Cores benchmark circuits in ST-65 nm LP and ST-28 nm FDSOI technologies. The netlists were synthesized using the methodology described above.

The tables of FIGS. 12B and 12C show the result of applying the local clocking strategy on five different Open-Cores benchmark circuits. The benchmark circuits were designed for the highest frequency possible. The tables highlight the effect of local clocking on the area, power, and wirelength of the benchmark circuits in 65 nm and 28 nm technologies, respectively. Tradeoffs to improve one of area, delay, or power generally come at the cost of another parameter. A circuit is said to be truly improved only if it shows improvement in the parameters, without trading off other parameters.

Most of the benchmark circuits show a significant improvement in the area, wirelength, and power, when local clocking is applied, in both technologies. This result shows that the algorithm can scale with technology, in general. This may not necessarily be true on a circuit-by-circuit basis. For example, the Wallace multiplier circuit does not show a significant improvement in the 65 nm technology when local clocking is applied, but the same design does show an improvement in the 28 nm technology. This is because there is a change in the type of available standard cells between the 65 nm and the 28 nm. The 65 nm technology contains complex standard cells such as a 3-bit Booth decoder cell. Such cells are extremely compact and can be used on noncritical paths. Since local clocking borrows time from noncritical paths, the standard-cell mapping of the noncritical path changes, resulting in an increase in the area and power in some cases. In the Wallace multiplier circuit, there are only three register stages: the input, intermediate, and output stage. The local clocking algorithm is designed to affect only the intermediate stages, which in the case of Wallace multiplier is a single stage. This makes the circuit extremely sensitive to technology mapping in the presence of clock skews. The 28 nm library mostly contains primitive standard cells such as AND, OR, full adders, etc., which makes it easier to predict the relative increase and decrease in the area and power of the noncritical and critical logic cones respectively. This allows the local clocking algorithm to generate a better set of source-target pairs in the 28 nm technology, which is needed to improve the area and power of the circuit.

The reduction in area and power when local clocking is used may be due in part to the following mechanism. High drive strength cells generally consume a large area, which in turn results in longer interconnecting wires. When high drive strength cells are replaced with lower drive strength cells, the area and power drop due to the following two reasons: (i) lower drive strength cells require lower area and power than the high drive strength cells, and (ii) the reduction in the interconnect size reduces the wire load on the cells, which leads to reduced drive-strength requirements for the standard cells, which in turn leads to either a reduction in the number of buffers, or a reduction in the drive strengths of the standard cells.

Figure 13:
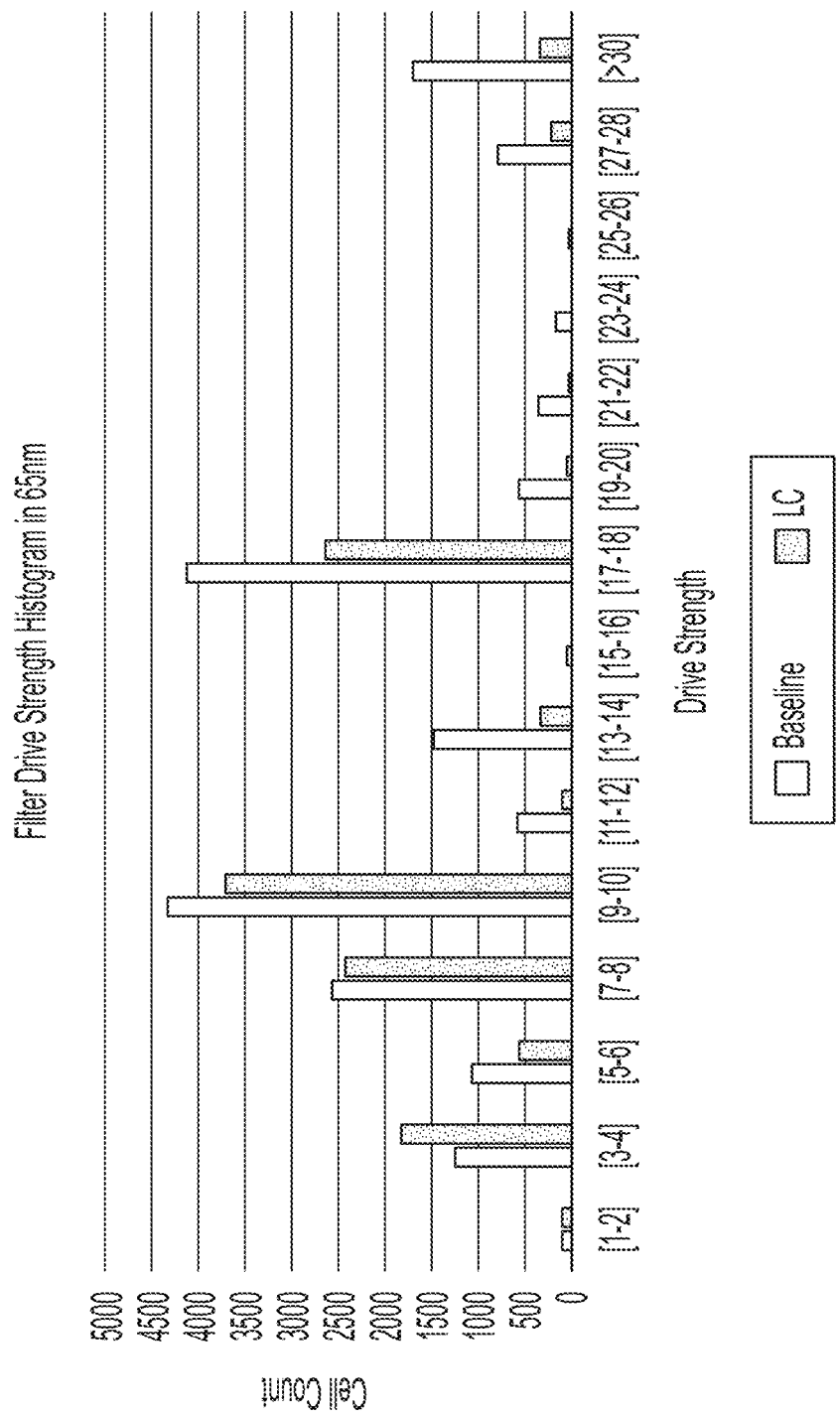
FIG. 13 is a graph of drive strengths, according to an embodiment of the present disclosure.
Figure 14A:
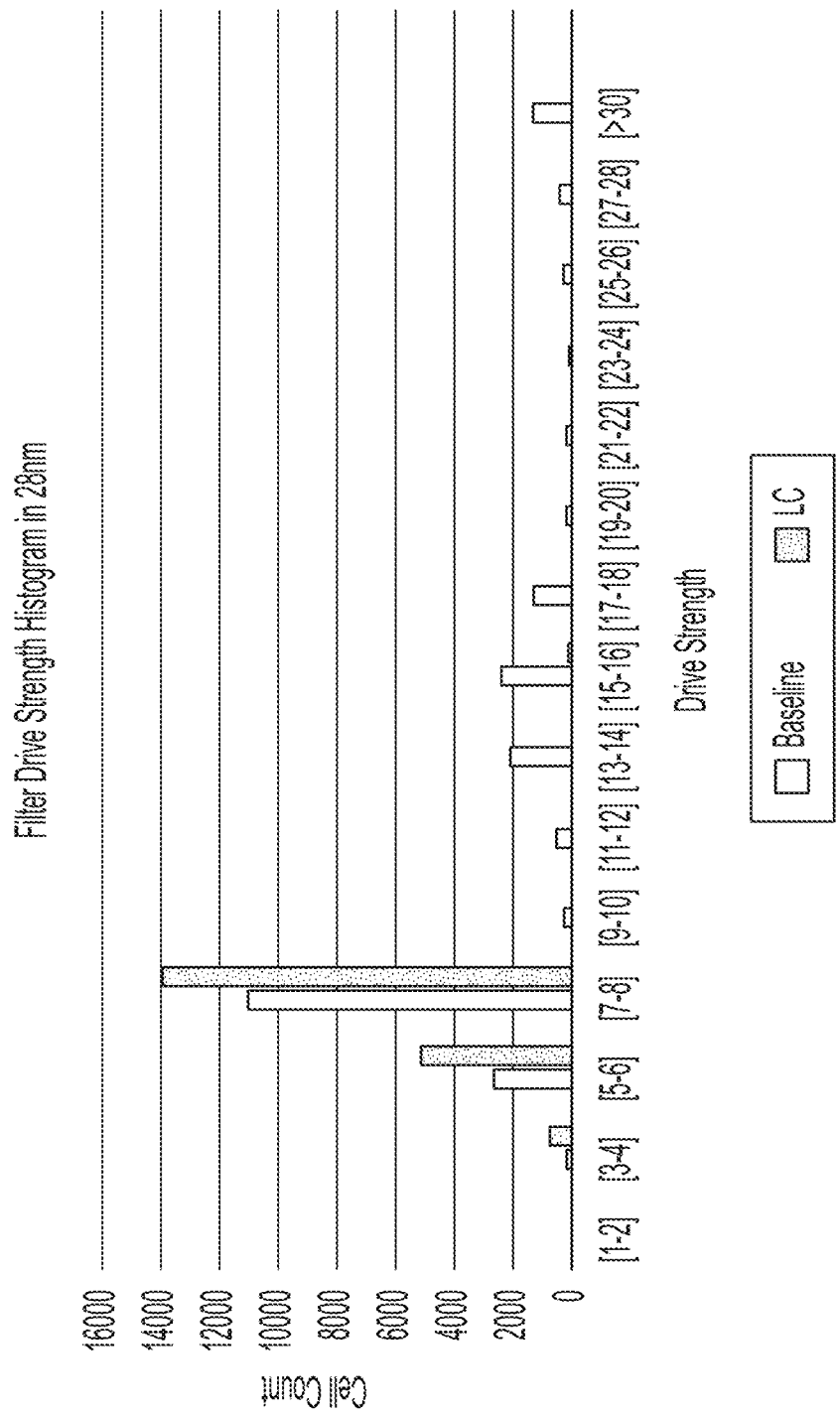
FIG. 14A is a graph of drive strengths, according to an embodiment of the present disclosure.

FIG. 13 shows the drive strength of cells in the Baseline (DFF) and the LC version of the filter in the 65 nm technology, operating at 500 MHz; the circuit was placed and routed using Cadence Innovus™. FIG. 14A shows the drive strength of cells in the Baseline (DFF) and the LC version of the filter in the 28 nm technology, operating at 1429 MHz; the circuit was placed and routed using Cadence™ Innovus™. FIG. 13 and FIG. 14A demonstrate the reduction in the overall drive strength of the cells. They show the reduction in the number of standard cells, as well as the number of high drive strength cells needed for a 6-stage filter circuit in both the 65 nm and 28 nm technologies, after the local clocking strategy is applied. This reduction results in overall area, power, and wirelength reductions. The table of FIG. 14B shows the mean and standard deviation of drive strength of the standard cells used in design of the filter. For both the 65 nm and 28 nm technologies, the use of KVFFs reduces the mean and variance of drive strength, and the use of local clocking reduces these metrics further.

Since KVFFs are faster than DFFs, they help generate slack on critical paths and reduce the drive strengths, thereby balancing the paths to some extent. The LC approach helps further balance the drive strengths by identifying imbalanced paths and imparting further slack to the paths with higher drive strength cells. Therefore, in certain benchmark circuits, if the paths are already balanced, then the LC approach may show a smaller improvement in the area, power, and wirelength than the circuits in which the paths are not balanced.

Although the benchmark circuits in this disclosure show significant improvement over multiple parameters against their baseline counterparts, the improvements demonstrated in this section are greatest when the designs have tight timing constraints. When the designs are not clocked at their maximum frequency, the number of cells with high drive strength is reduced, which reduces the scope for improvement using the local clocking strategy.

Local clocking may be used for reducing the area and power of standard cell ASICs, and local clocking may also be used for fixing hold-time violations for a regular (1.21 V in 65 nm; 0.9 V in 28 nm) mode of operation, in the presence of process variations. A circuit including two registers, where register X feeds register Y, may be used as an example to demonstrate this. Since there is no combinational logic between them, there is a potential for a hold-time violation between registers X and Y.

Figures 15A, 15B:
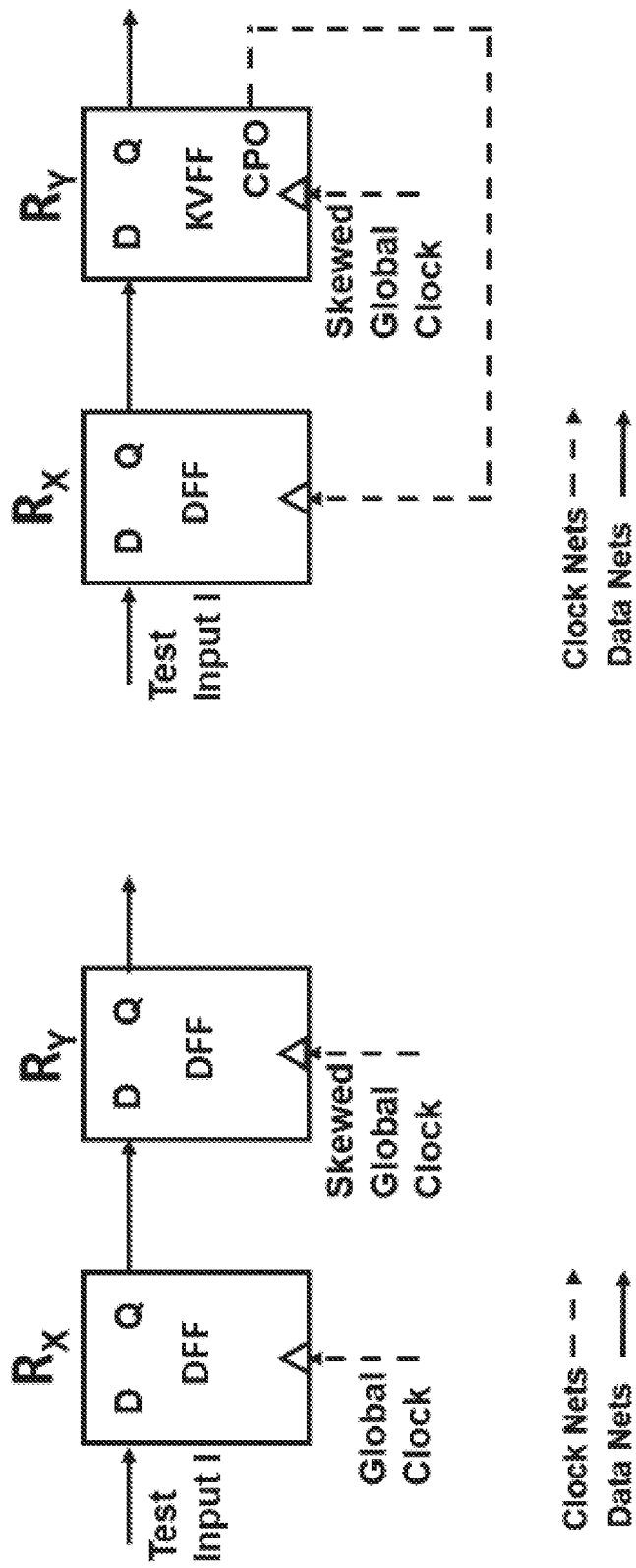
FIG. 15A is a schematic drawing of a digital circuit, according to an embodiment of the present disclosure.
FIG. 15B is a schematic drawing of a digital circuit, according to an embodiment of the present disclosure.

FIG. 15A shows a hold time violation test setup for a circuit vulnerable to hold time violation. FIG. 15B shows a hold time violation test setup for a circuit invulnerable to hold time violation due to the use of local clocking. A Monte Carlo simulation with 100k instances was done for the example circuits shown in FIGS. 15A and 15B, to demonstrate the hold-time violation and its fix using the local clocking approach.

Figure 16A:
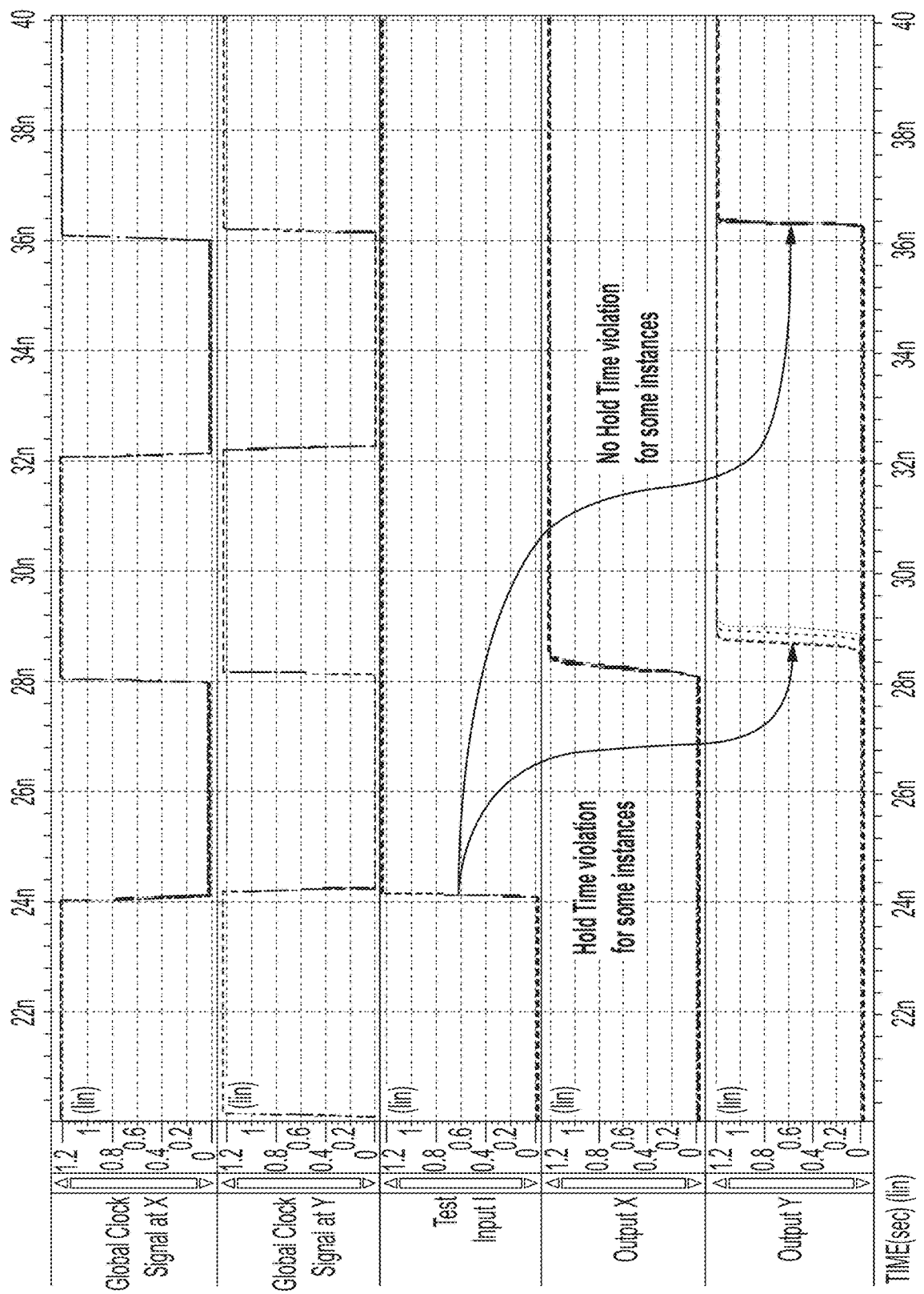
FIG. 16A is a timing diagram, according to an embodiment of the present disclosure.
Figure 16B:
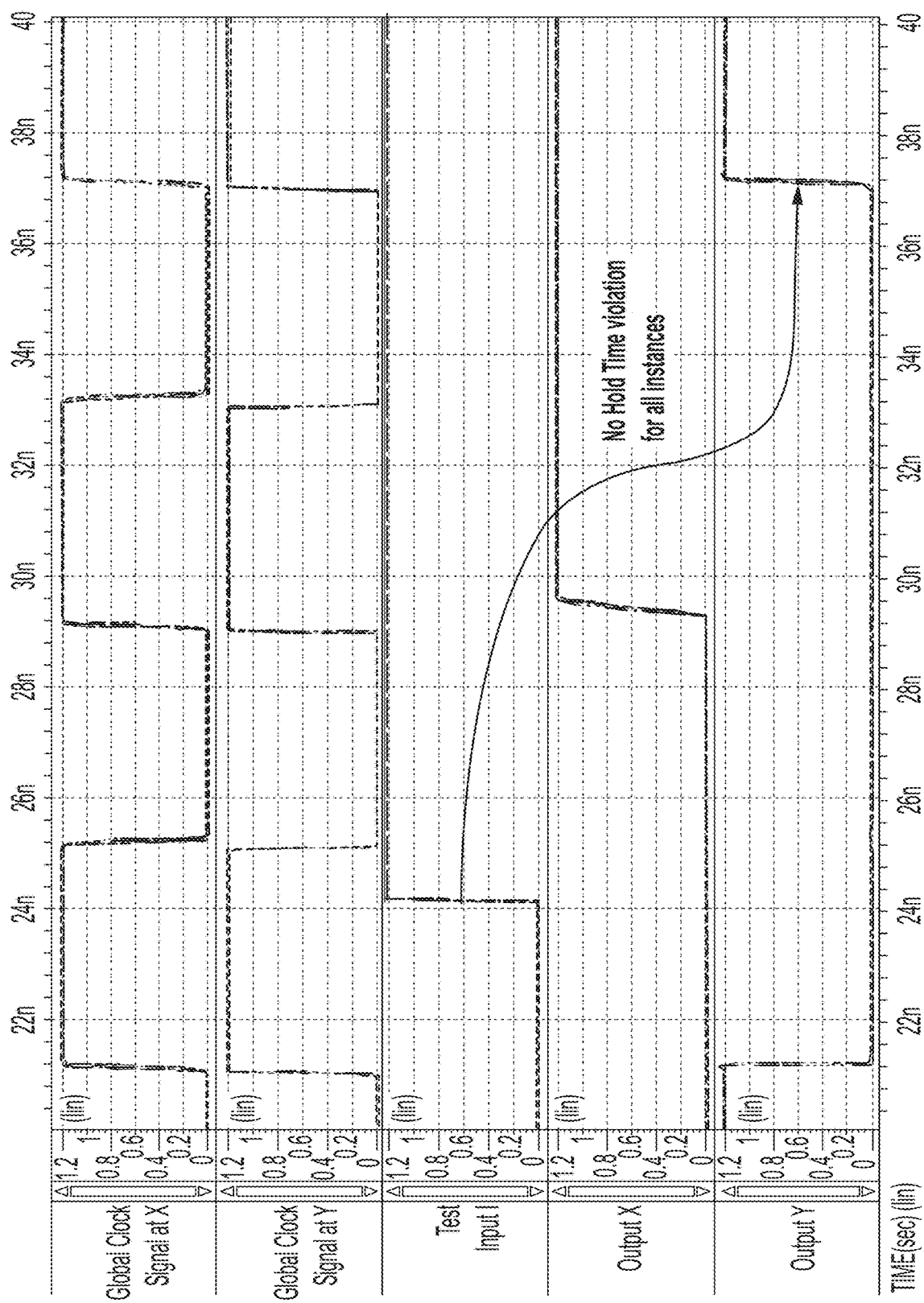
FIG. 16B is a timing diagram, according to an embodiment of the present disclosure.
Figure 17A:
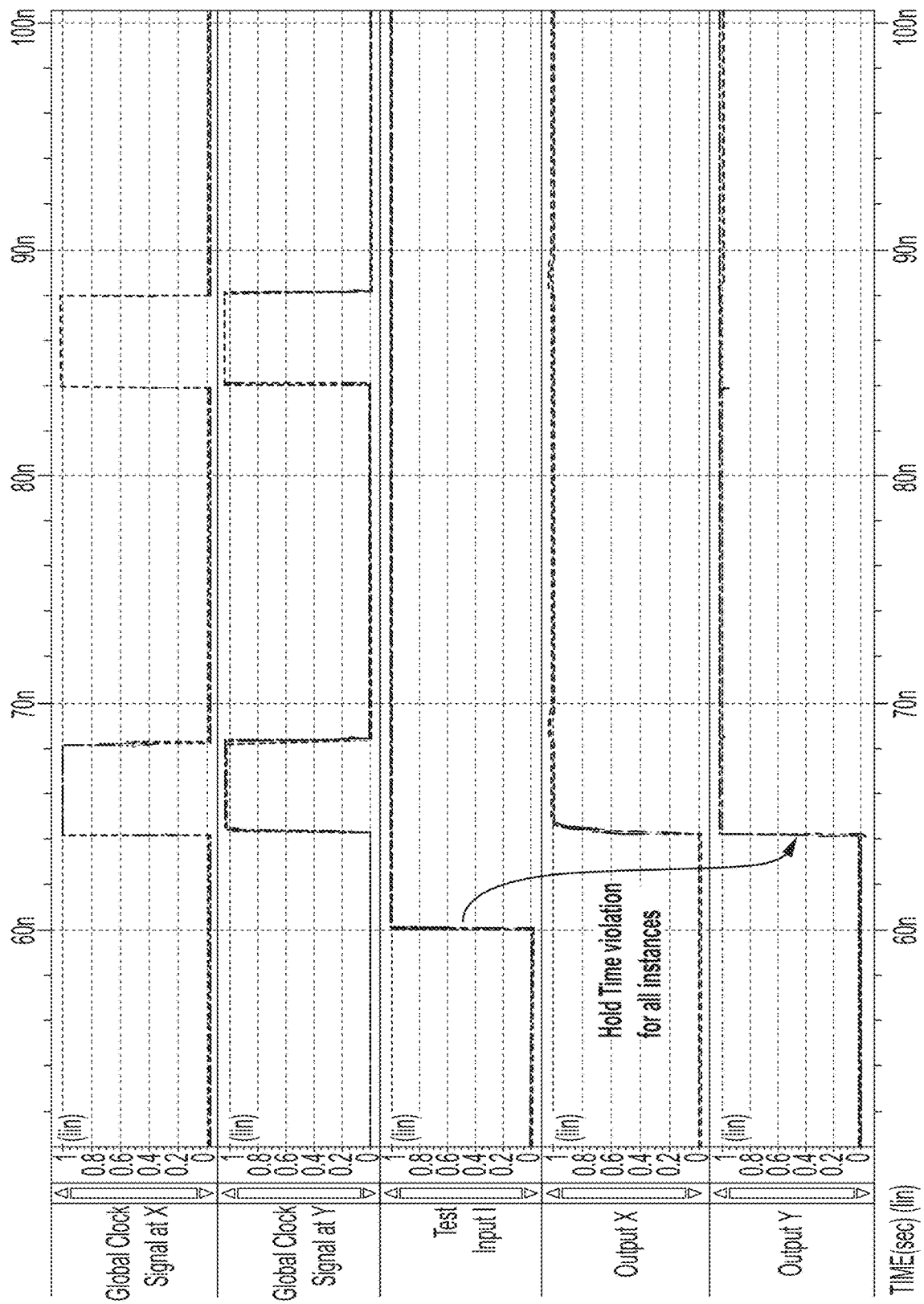
FIG. 17A is a timing diagram, according to an embodiment of the present disclosure.
Figure 17B:
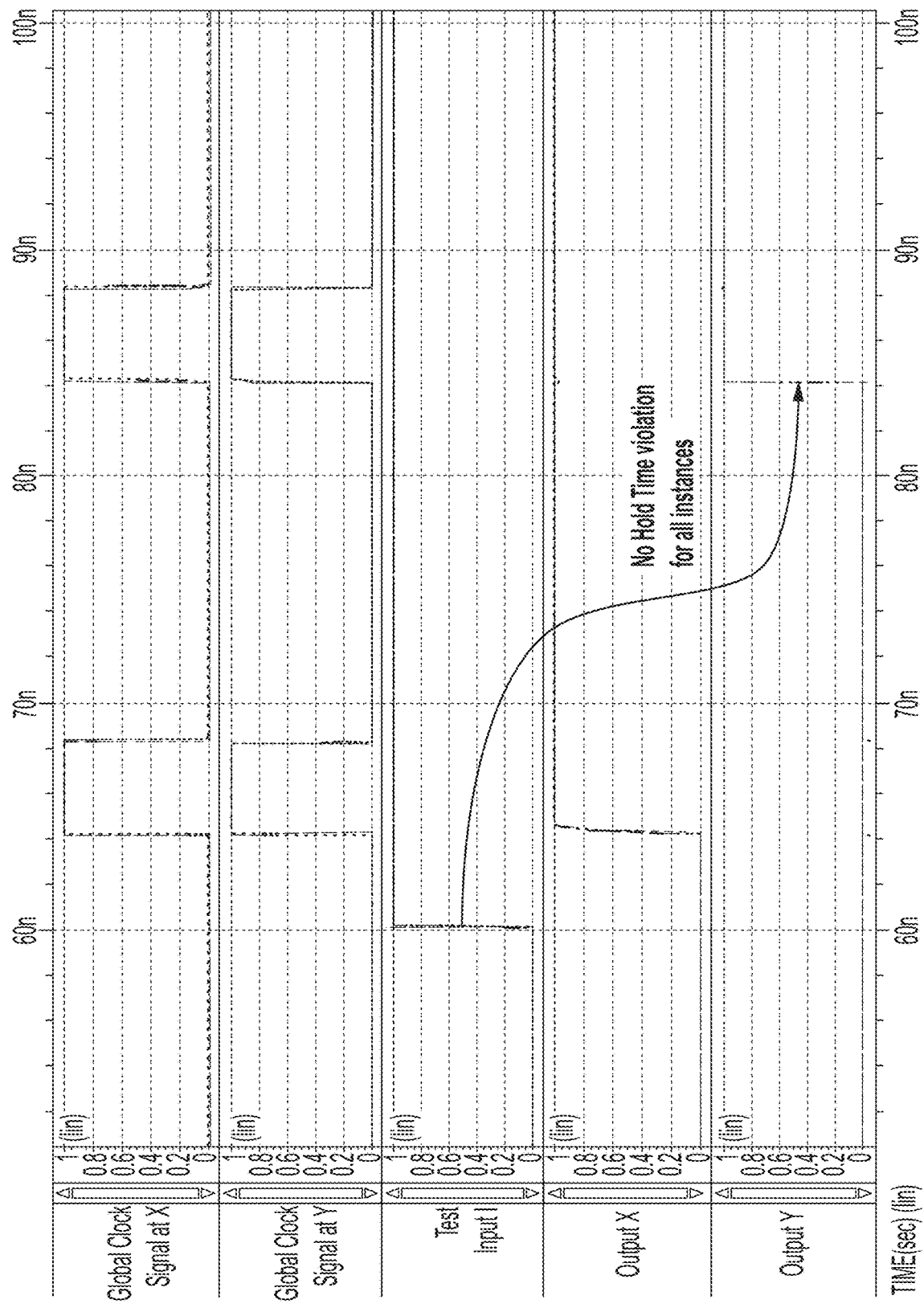
FIG. 17B is a timing diagram, according to an embodiment of the present disclosure.

FIGS. 16A and 16B show a hold violation fix using local clocking in 65 nm at a typical-typical (TT) corner of 25° C. and supply voltage of 1.21 V using local clocking, for 100k Monte Carlo instances. FIGS. 17A and 17B show a hold violation fix using local clocking in 28 nm at TT 25° C., 0.9 V using local clocking, for 100k Monte Carlo instances. The violation can be seen in FIGS. 16A and 17A for the 65 nm and 28 nm technologies respectively. To fix this violation, a local clock from Y is used to clock X. The register Y only generates the clock once it reads the data from X. Therefore, the data at the input of Y cannot be overwritten with the data at the input of X in the wrong clock cycle. FIGS. 16B and 17B show the output waveform of Y, after the hold-time violation is removed using local clocking, for 65 nm and 28 nm technologies respectively. In a circuit, registers with hold time violations may be identified based on the timing reports and fixed using the technique described above.

In the circuit shown in FIG. 3, register X sends data to register Y, and register Y sends back the clock to register X. Here, the clock received by X, and its output, are interdependent. When the circuit is powered up, the inputs at transistors M5 and M6 (FIG. 5) are hard to determine. They can be at either VDD or GND. In the worst case, $D=\overline{D}=VDD/2$ is applied at the inputs of M5 and M6, when the circuit is powered up. Register Y resets when the clock transitions from 1 to 0, which pulls both the N1 and N2 nets (FIG. 5) to 1, which in turn makes the output clock CPO go to 0. If the signals $D=\overline{D}$ remain at VDD/2 in the following rising edge of the global clock, then the clock to output CPO will never go to 1. Note that this problem only occurs when the chip is initially powered up. Once the input data becomes stable, $D \neq \overline{D}$, and the CPO output will properly follow the global clock. This problem can be avoided by providing a reset mechanism in the KVFFs. In some embodiments, however, the KVFF design does not incorporate a reset mechanism, and instead, this problem is handled by initializing all the signals to 0 using scan chains when the circuit is powered up, as follows, and as discussed in U.S. Pat. No. 10,551,869, which is incorporated herein by reference.

Figure 18A:
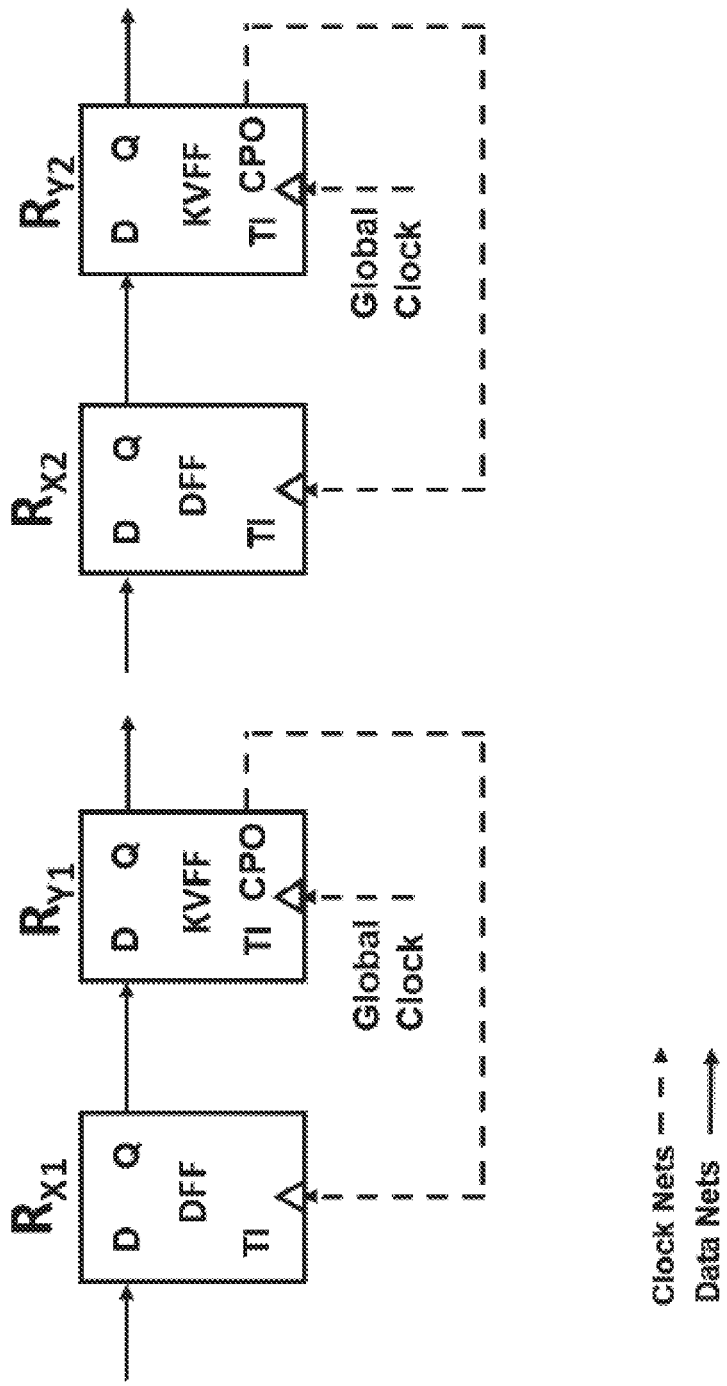
FIG. 18A is a schematic drawing of a digital circuit, according to an embodiment of the present disclosure.
Figure 18B:
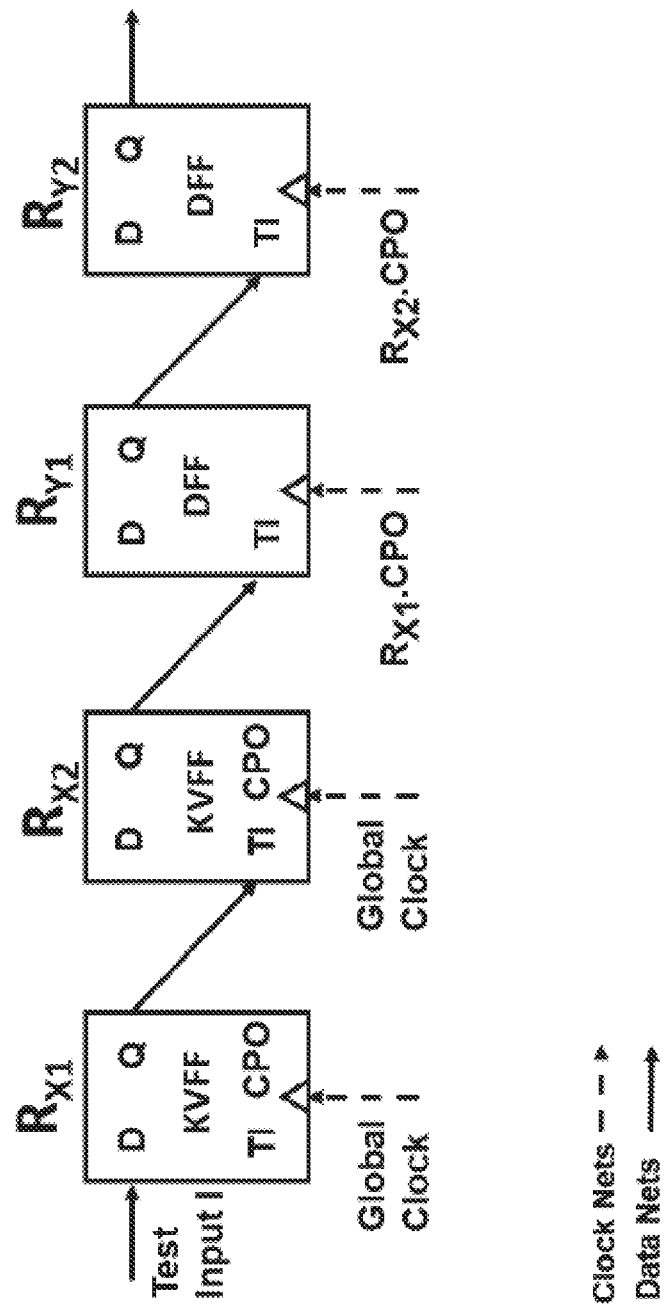
FIG. 18B is a schematic drawing of a digital circuit, according to an embodiment of the present disclosure.

In some embodiments, when incorporating the scan mechanism, it is possible to restitch the scan-chain as shown in FIGS. 18A and 18B. In the scan mode, the CPO output of both (in general all) Y1 and Y2 registers will rise (i.e., they will not remain at 0) by connecting the test input (TI) of these registers as shown. TI is the standard multiplexed scan input, which is assumed and not shown in FIG. 5. The ordering shown ensures that the registers Y1 and Y2 receive a proper test input in each cycle and ensures that all registers are properly initialized. This simply requires the scan mode to be enabled after the chip is powered for as many cycles as there are KVFFs used for LC.

The initialization process explained above may be employed in part because the KVFFs do not have a reset mechanism. This is because adding a reset mechanism would require two additional transistors to pull up the voltages of N1 and N2 to VDD, which would negatively impact the slew rate of the output clock CPO due to increased load on N1 and N2. To the extent that the gains in the area, power, and wirelength outweigh the time lost initializing the circuit, KVFFs may be used without the reset functionality.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B.

Portions of methods disclosed herein may be performed by one or more processing circuits. Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Although exemplary embodiments of a system and method for clock distribution in a digital circuit have been specifically described and illustrated herein, many modifications and variations will be apparent to those skilled in the art. Accordingly, it is to be understood that a system and method for clock distribution in a digital circuit constructed according to principles of this disclosure may be embodied other than as specifically described herein. The invention is also defined in the following claims, and equivalents thereof.

What is claimed is:

1. A non-transitory computer-readable medium comprising stored instructions, which when executed by a processor, cause the processor to:
    modify a synchronous digital logic circuit, the modifying comprising:
        replacing a first D flipflop in the circuit with a local-clocking source flipflop; and
        connecting a clock output of the local-clocking source flipflop to a clock input of a second D flipflop,
    instruct a placing and routing tool that a data path from the first D flipflop of the synchronous digital logic circuit to the local-clocking source flipflop of the synchronous digital logic circuit is a false path, and
    place and route the synchronous digital logic circuit,
    wherein the replacing and connecting increases an objective function, the objective function being based on the number of high drive strength cells in a logic cone preceding the second D flipflop.

2. The non-transitory computer-readable medium of claim 1, wherein the replacing and connecting further satisfies a plurality of constraints.

3. The non-transitory computer-readable medium of claim 2, wherein a constraint of the plurality of constraints constrains the clock input of the second D flipflop to be connected to one clock output.

4. The non-transitory computer-readable medium of claim 2, wherein a constraint of the plurality of constraints constrains a fan-out of the local-clocking source flipflop.

5. The non-transitory computer-readable medium of claim 2, wherein a constraint of the plurality of constraints is based on:
    an arrival time of a clock edge at the local-clocking source flipflop;
    a delay of the local-clocking source flipflop; and an arrival time of a clock edge at the second D flipflop.

6. The non-transitory computer-readable medium of claim 1, wherein a constraint of a plurality of constraints constrains the arrival of a data signal at the second D flipflop to precede the arrival of a clock edge at the second D flipflop by at least the setup time of the second D flipflop.

7. The non-transitory computer-readable medium of claim 6, wherein a constraint of the plurality of constraints constrains a data signal to remain at an input of the local-clocking source flipflop, after the arrival of a clock edge at the local-clocking source flipflop, during at least the hold time of the local-clocking source flipflop.

8. The non-transitory computer-readable medium of claim 7, comprising solving an integer linear programming problem to identify the first D flipflop and the second D flipflop.

9. The non-transitory computer-readable medium of claim 8, wherein the solving of the integer linear programming problem comprises solving the integer linear programming problem subject to constraints based on setup and hold times.

10. The non-transitory computer-readable medium of claim 9, wherein a constraint based on a setup time allows a timing violation less than a margin.

11. The non-transitory computer-readable medium of claim 9, wherein a constraint based on a hold time allows a timing violation less than a margin.

12. The non-transitory computer-readable medium of claim 1, further comprising placing and routing the modified synchronous digital logic circuit.

13. The non-transitory computer-readable medium of claim 12, wherein the placing and routing comprises instructing a placing and routing tool that a data path from the second D flipflop to the local-clocking source flipflop is a false path.

14. A method for fabricating a synchronous digital logic circuit, the method comprising:
   modifying a precursor circuit, the modifying comprising:
      replacing a first D flipflop in the precursor circuit with a local-clocking source flipflop; and
      connecting a clock output of the local-clocking source flipflop to a clock input of a second D flipflop;
   instructing a placing and routing tool that a data path from the first D flipflop of the synchronous digital logic circuit to the local-clocking source flipflop of the synchronous digital logic circuit is a false path; and
   placing and routing the synchronous digital logic circuit,
   wherein the replacing and connecting satisfies a plurality of constraints and increases an objective function, the objective function being based on the number of high drive strength cells in a logic cone preceding the first D flipflop.

15. The method of claim 14, wherein a constraint of the plurality of constraints constrains the clock input of the second D flipflop to be connected to one clock output.

16. The method of claim 14, wherein a constraint of the plurality of constraints constrains a fan-out of the local-clocking source flipflop.

17. The method of claim 14, wherein a constraint of the plurality of constraints is based on:
   an arrival time of a clock edge at the local-clocking source flipflop;
   a delay of the local-clocking source flipflop; and
   an arrival time of a clock edge at the second D flipflop.

18. The method of claim 14, wherein a constraint of the plurality of constraints constrains the arrival of a data signal at the second D flipflop to precede the arrival of a clock edge at the second D flipflop by at least the setup time of the second D flipflop.

19. The method of claim 14, wherein a constraint of the plurality of constraints constrains a data signal to remain at an input of the local-clocking source flipflop, after the arrival of a clock signal at the local-clocking source flipflop, during at least the hold time of the local-clocking source flipflop.

* * * * *